(12) United States Patent
Ishizuka et al.

(10) Patent No.: US 8,193,675 B2
(45) Date of Patent: Jun. 5, 2012

(54) STATOR FOR ELECTRIC ROTATING MACHINE

(75) Inventors: Atsuo Ishizuka, Nagoya (JP); Atsushi Umeda, Okazaki (JP)

(73) Assignee: Denso Corporation, Kariya (JP)

( * ) Notice: Subject to any disclaimer, the term of this patent is extended or adjusted under 35 U.S.C. 154(b) by 273 days.

(21) Appl. No.: 12/638,122

(22) Filed: Dec. 15, 2009

(65) Prior Publication Data

US 2010/0148621 A1 Jun. 17, 2010

(30) Foreign Application Priority Data

Dec. 15, 2008 (JP) ................................ 2008-319003
Dec. 10, 2009 (JP) ................................ 2009-280734

(51) Int. Cl.
*H02K 3/04* (2006.01)

(52) U.S. Cl. ....................................... 310/201; 310/207

(58) Field of Classification Search .................. 310/201, 310/207, 180, 205, 206, 208

See application file for complete search history.

(56) References Cited

U.S. PATENT DOCUMENTS 6,140,735 A  10/2000  Kato et al.
8,008,830 B2 *  8/2011  Kouda et al. .................. 310/201
8,018,112 B2 *  9/2011  Dobashi et al. ............... 310/180
2009/0260217 A1 *  10/2009  Kamakura et al. ............. 29/596

FOREIGN PATENT DOCUMENTS

JP          2000-139048       5/2000
WO       WO 2008/108351    9/2008

* cited by examiner

*Primary Examiner* — Nguyen N Hanh
(74) *Attorney, Agent, or Firm* — Nixon & Vanderhye PC

(57) ABSTRACT

A stator includes a hollow cylindrical stator core and a stator coil made up of wave-shaped electric wires. Each of the electric wires has in-slot portions, which are received in slots of the stator core, and turn portions that are located outside of the slots to connect the in-slot portions. The stator coil includes first crank-shaped portions and second crank-shaped portions. Each of the first and second crank-shaped portions is provided, in one of the electric wires, at the center of an apex part of one of the turn portions and is radially bent to shift the radial position of the electric wire. The amount of radial position shift made by each of the second crank-shaped portions is less than that made by each of the first crank-shaped portions. The second crank-shaped portions are located at a plurality of places in the circumferential direction of the stator core.

14 Claims, 22 Drawing Sheets

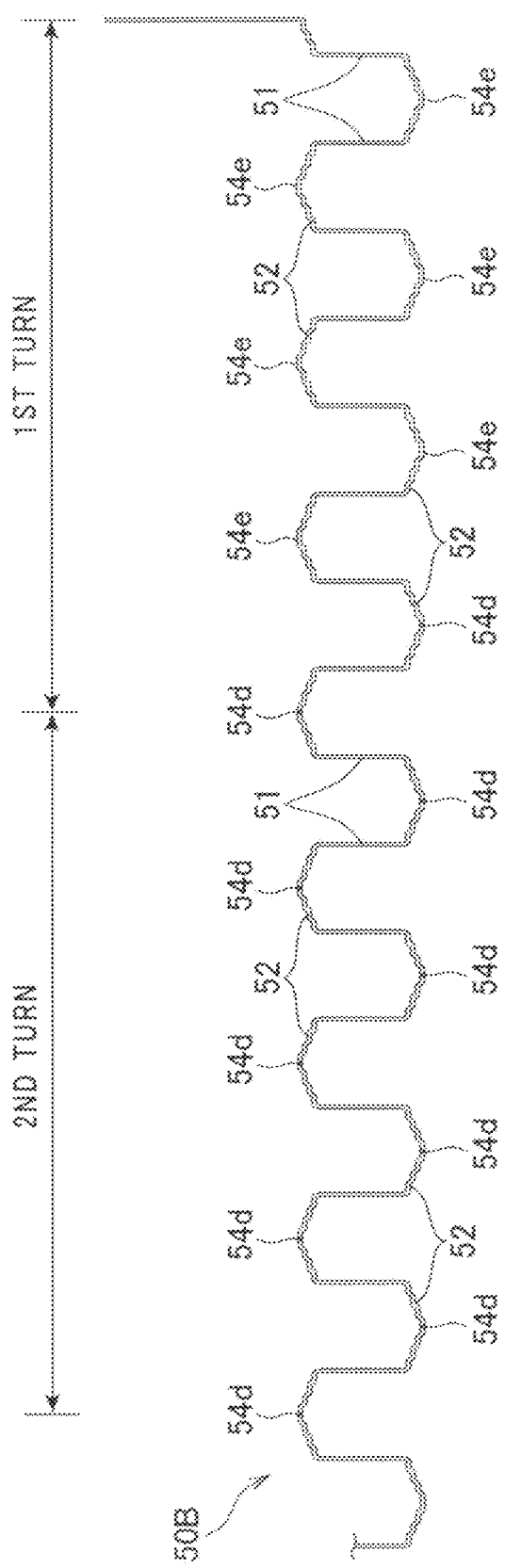

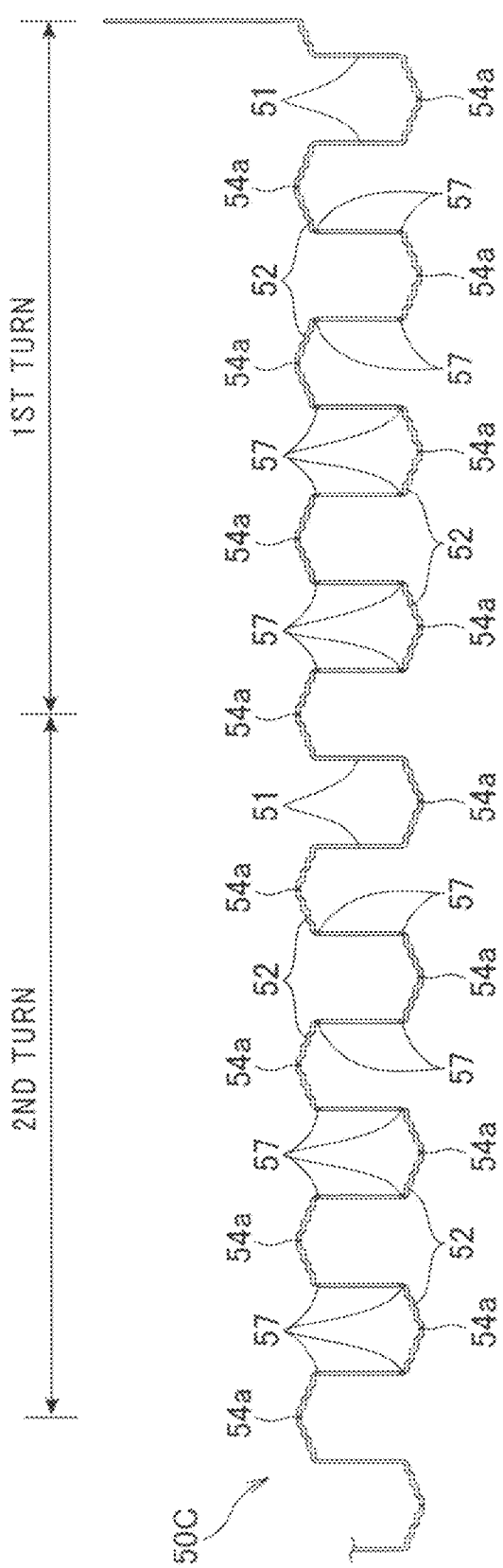

STATOR FOR ELECTRIC ROTATING MACHINE

CROSS-REFERENCE TO RELATED APPLICATION

This application is based on and claims priority from Japanese Patent Applications No. 2008-319003, filed on Dec. 15, 2008, and No. 2009-280734, filed on Dec. 10, 2009, the contents of which are hereby incorporated by reference into this application.

BACKGROUND OF THE INVENTION

1. Technical Field of the Invention

The present invention relates to stators for electric rotating machines that are used in, for example, motor vehicles as electric motors and electric generators.

2. Description of the Related Art

In recent years, electric rotating machines, such as electric motors and electric generators, have been required to be compact, be able to output high power, and have high quality. In particular, for electric rotating machines for use in motor vehicles, the spaces available for installation of those machines in the motor vehicles have been decreasing, while the need for them to output high power has been increasing.

Generally, for making an electric rotating machine compact while enabling it to output high power, it is required to: reduce the resistances of rotor and stator coils of the machine; improve the space factors of electric wires, which form the stator coil, in slots of a stator core of the machine; and arrange regularly and densely those portions of the electric wires which protrude outside of the slots of the stator core.

To meet the above requirements, PCT International Publication No. WO 2008/108351 A1 and Japanese Patent First Publication No. 2000-139048, both of which have the same assignee as the present application, disclose techniques for improving stators for electric rotating machines. Those stators each include a hollow cylindrical stator core and a stator coil mounted on the stator core. The stator core has a plurality of slots that are formed in the radially inner surface of the stator core and spaced in the circumferential direction of the stator core at predetermined intervals. The stator coil is made up of a plurality of electric wires wave-wound around the stator core. Specifically, each of the electric wires includes a plurality of in-slot portions, which are received in the slots of the stator core, and a plurality of turn portions that are located outside of the slots to connect the in-slot portions.

According to one technique disclosed in PCT International Publication No. WO 2008/108351 A1, each of the turn portions of the electric wires is configured to include a plurality of shoulder parts that extend parallel to an axial end face of the stator core. With the shoulder parts, it is possible to densely arrange the turn portions of the electric wires and to reduce the protruding height of the turn portions from the axial end face of the stator core.

According to another technique disclosed in Japanese Patent First Publication No. 2000-139048, the stator coil is formed by: (1) interlacing the electric wires in a predetermined manner to form a flat band-shaped electric wire assembly; and (2) rolling the flat band-shaped electric wire assembly by a predetermined number of turns to form a hollow cylindrical electric wire assembly which makes up the stator coil. With this technique, it is possible to reduce the radial width of the turn portions of the electric wires. In addition, the stator coil disclosed in PCT International Publication No. WO 2008/108351 A1 is also formed using the above technique.

However, with the above technique for forming the stator coil, when the number of the electric wires is large, the process of interlacing the electric wires may become very complicated, thus increasing the manufacturing cost of the stator coil.

Therefore, the inventors of the present invention have investigated a simpler method of forming the flat band-shaped electric wire assembly. As a result, they have concluded that the manufacturing cost of the stator coil may be reduced by forming the flat band-shaped electric wire assembly by simply stacking, instead of interlacing, the electric wires.

However, in this case, if the electric wires were not properly shaped, the thickness of the resultant flat band-shaped electric wire assembly would vary cyclically in the longitudinal direction of the assembly. Moreover, the variation in the thickness of the assembly would be greater than that in the case of forming the assembly by interlacing the electric wires. Consequently, in the stator coil that is obtained by rolling the flat band-shaped electric wire assembly into the hollow cylindrical shape, there would be cyclically formed protruding portions which protrude radially inward from the radially inner surface of the stator coil or radially outward from the radially outer surface of the stator coil. As a result, both the outer diameter and radial width of the stator coil would be enlarged, thereby making it difficult to downsize the stator.

SUMMARY OF THE INVENTION

According to the present invention, there is provided a stator for an electric rotating machine which includes a hollow cylindrical stator core and a stator coil. The stator core has a plurality of slots that are formed in the radially inner surface of the stator core and spaced at predetermined intervals in the circumferential direction of the stator core. The stator coil is made up of a plurality of wave-shaped electric wires mounted on the stator core. Each of the electric wires has a plurality of in-slot portions, each of which is received in one of the slots of the stator core, and a plurality of turn portions each of which is located outside of the slots of the stator core to connect one adjacent pair of the in-slot portions of the electric wire. Each of the turn portions includes an apex part that is located axially furthest in the turn portion from the stator core. Further, the stator coil includes a plurality of first crank-shaped portions and a plurality of second crank-shaped portions. Each of the first and second crank-shaped portions is provided, in one of the electric wires, at the center of the apex part of one of the turn portions of the electric wire and is radially bent to shift the radial position of the electric wire. The amount of radial position shift made by each of the second crank-shaped portions is less than that made by each of the first crank-shaped portions. The second crank-shaped portions are located at a plurality of places in the circumferential direction of the stator core.

With the first crank-shaped portions, it is possible to prevent interference between the turn portions of the electric wires protruding from circumferentially-adjacent pairs of the slots of the stator core. Moreover, with the second crank-shaped portions, it is possible to keep the coil ends of the stator coil from protruding radially outward or radially inward at the places where the second crank-shaped portions are located. As a result, both the outer diameter and radial width of the stator coil can be minimized, thereby making it possible to downsize the stator.

According to a further implementation of the invention, the plurality of electric wires include first-type electric wires and second-type electric wires. Each of the first-type electric wires includes only at least one of the first crank-shaped portions, and each of the second-type electric wires includes both at least one of the first crank-shaped portions and at least one of the second crank-shaped portions.

One of the second-type electric wires may include a plurality of crank-shaped portion groups each of which consists of m of the first crank-shaped portions and n of the second crank-shaped portions, where m and n each represent an integer greater than zero. The plurality of crank-shaped portion groups are cyclically arranged in a longitudinal direction of the second-type electric wire.

Moreover, another of the second-type electric wires may include j of the first crank-shaped portions on one longitudinal end side and k of the second crank-shaped portions on the other longitudinal end side of the second-type electric wire, where j and k each represent an integer greater than zero, and the sum of j and k is equal to the number of the apex parts of the turn portions in the second-type electric wire.

The number of the electric wires making up the stator coil is h, where h is an integer greater than 1. The stator coil is a hollow cylindrical electric wire assembly that is fowled by rolling a flat band-shaped electric wire assembly by a predetermined number of turns; the flat band-shaped electric wire assembly is formed by sequentially stacking the h electric wires. The second to (h−1)th electric wires in the sequential stacking of the h electric wires are the first-type electric wires.

Each of the turn portions of the electric wires is stepped to include a plurality of shoulder parts that extend parallel to an axial end face of the stator core from which the turn portion protrudes.

Each of the electric wires is made up of an electric conductor having a rectangular cross section and an insulating coat covering the surface of the electric conductor.

The amount of radial position shift made by each of the second crank-shaped portions may be set to zero. In other words, each of the second crank-shaped portions may be reduced to a straight portion that extends in the circumferential direction of the stator core without being radially bent.

BRIEF DESCRIPTION OF THE DRAWINGS

The present invention will be understood more fully from the detailed description given hereinafter and from the accompanying drawings of one preferred embodiment of the invention, which, however, should not be taken to limit the invention to the specific embodiment but are for the purpose of explanation and understanding only.

In the accompanying drawings:

FIG. 13 is a front view of an end portion of a second-type electric wire for fanning the electric wire assembly;

FIG. 14 is a front view of an end portion of a third-type electric wire for forming the electric wire assembly;

FIGS. 15A and 153 are respectively enlarged top and front views of a portion of the first-type electric wire;

FIGS. 16A and 163 are respectively enlarged top and front views of a portion of the second-type electric wire;

FIGS. 17A and 173 are respectively enlarged top and front views of a portion of the third-type electric wire;

FIGS. 18A and 1813 are respectively enlarged top and front views of a portion of the first-type or second-type electric wire;

DESCRIPTION OF PREFERRED EMBODIMENT

Figure 1:
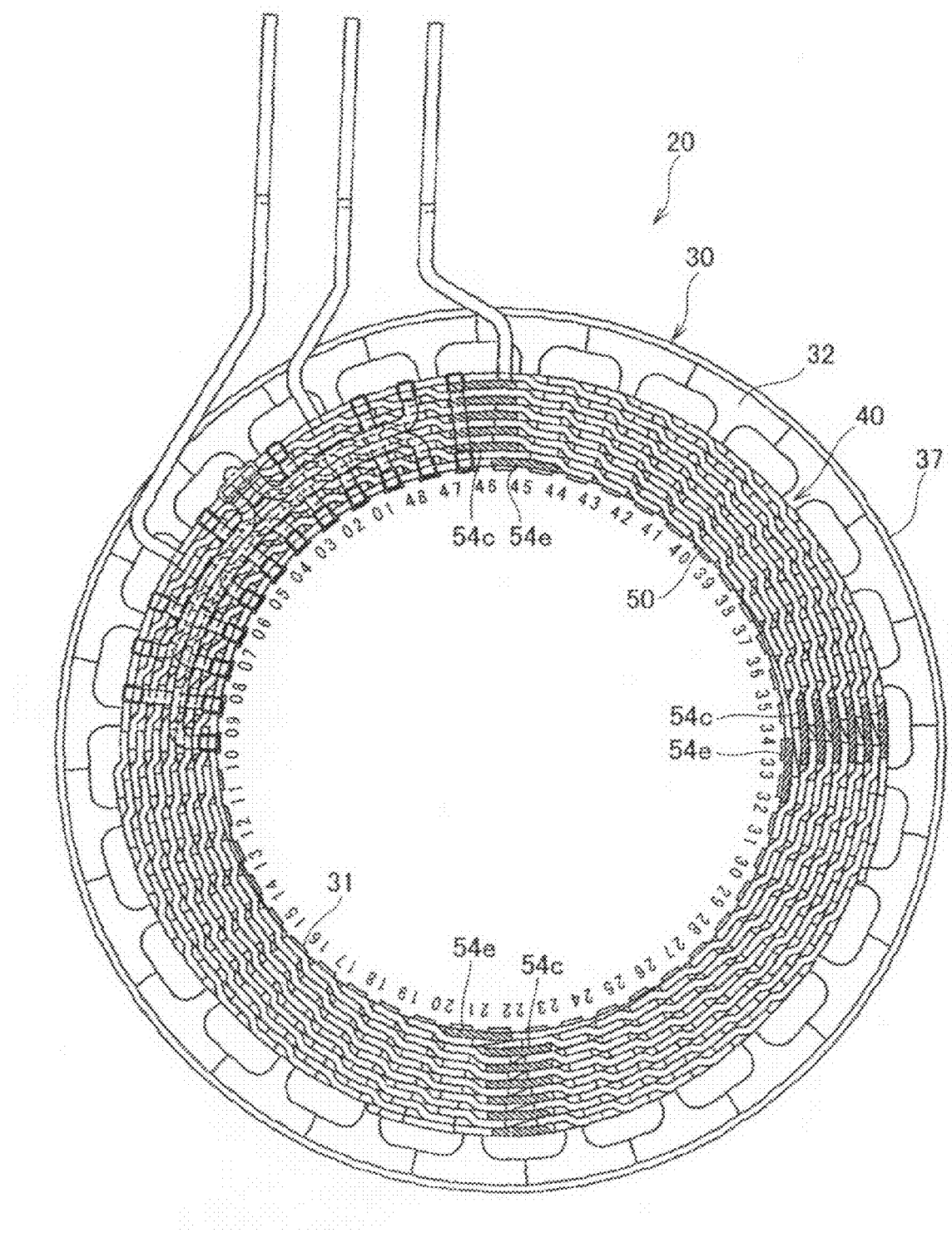
FIG. 1 is a top view of a stator according to a preferred embodiment of the invention.

One preferred embodiment of the present invention will be described hereinafter with reference to FIGS. 1-24.

FIGS. 1-4 together show the overall configuration of a stator 20 according to a preferred embodiment of the invention. The stator 20 is designed for use in, for example, an electric rotating machine which is configured to function both as an electric motor and as an electric generator in a motor vehicle. The electric rotating machine further includes a rotor (not shown) that is rotatably disposed so as to be surrounded by the stator 20. The rotor includes a plurality of permanent magnets that form a plurality of magnetic poles on a radially outer periphery of the rotor to face a radially inner periphery of the stator. The polarities of the magnetic poles alternate between north and south in the circumferential direction of the rotor. In addition, in the present embodiment, the number of the magnetic poles formed in the rotor is equal to eight four north poles and four south poles).

As shown in FIGS. 1-4, the stator 20 includes a hollow cylindrical stator core 30 and a three-phase stator coil 40 that is made up of a plurality of (e.g., twelve in the present embodiment) wave-shaped electric wires 50 wound around the stator core 30. In addition, the stator 20 may further include insulating paper sheets interposed between the stator core 30 and the stator coil 40.

The stator core 30 has a plurality of slots 31 that are formed in the radially inner surface of the stator core 30 and spaced in the circumferential direction of the stator core 30 at predetermined intervals. For each of the slots 31, the depth-wise direction of the slot 31 is coincident with the radial direction of the stator core 30. In the present embodiment, with respect to each of the eight magnetic poles of the rotor, there are provided two slots 31 for each of the three phases of the stator coil 40. Accordingly, the total number of the slots 31 provided in the stator core 30 is equal to 48 (i.e., 8×3×2). In addition, in FIGS. 1 and 2, slot numbers 1-48 are respectively given to the 48 slots 31, at the same circumferential positions as the respective slots 31, so as to distinguish the slots 31 from one another.

Moreover, in the present embodiment, the stator core 30 is made up of, for example, 24 stator core segments that are connected together to adjoin one another in the circumferential direction of the stator core 30. On the radially outer surfaces of the stator core segments, there is fitted a cylindrical outer rim 37. Each of the stator core segments defines therein one of the slots 31. Further, each circumferentially-adjoining pair of the stator core segments together defines one of the slots 31 therebetween. In addition, in the present embodiment, each of the stator core segments is formed by laminating a plurality of magnetic steel sheets with a plurality of insulting films interposed therebetween. It should be noted that other conventional metal sheets may also be used instead of the magnetic steel sheets.

Figure 5:
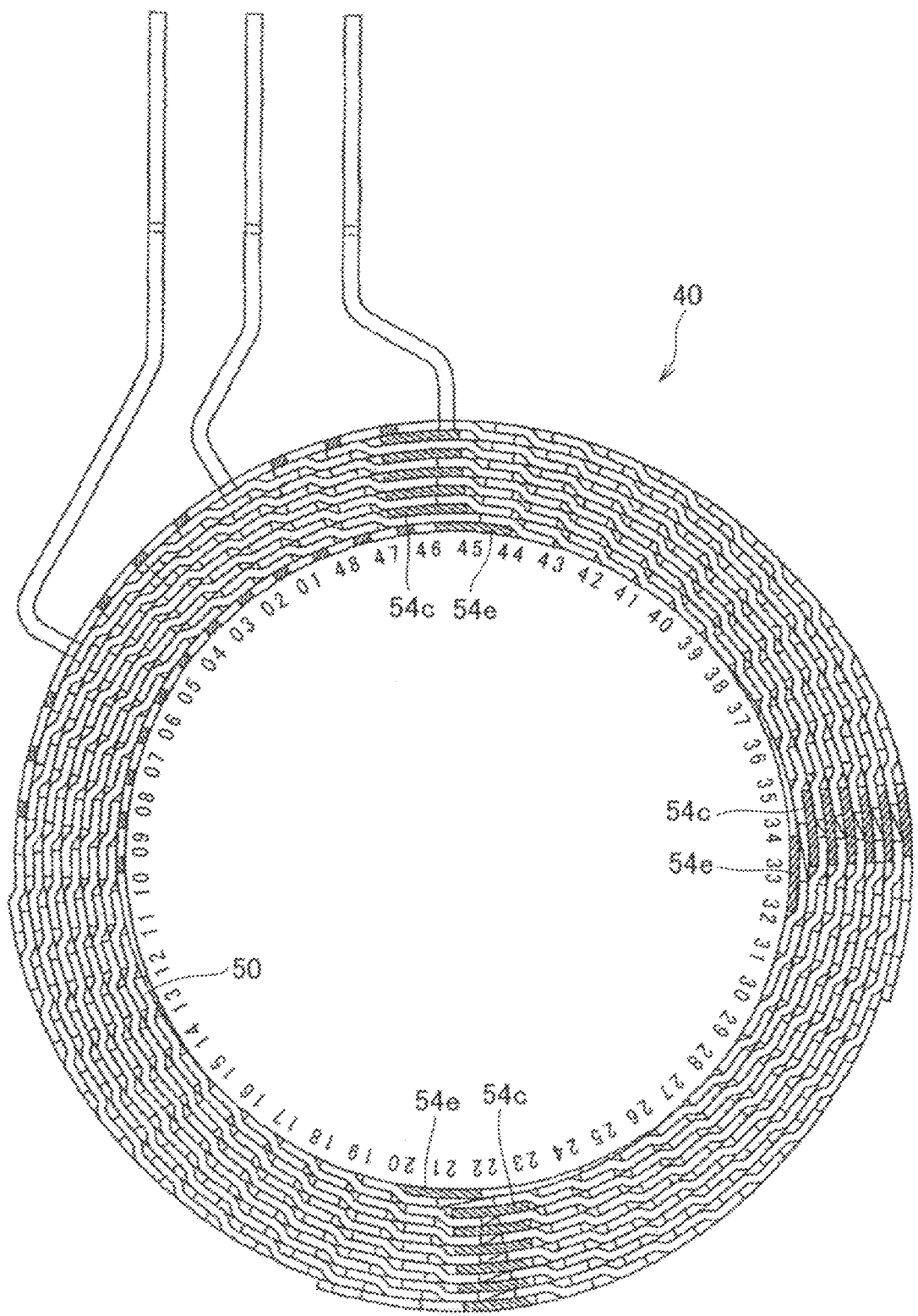
FIG. 5 is a top view of a stator coil of the stator.
Figure 6:
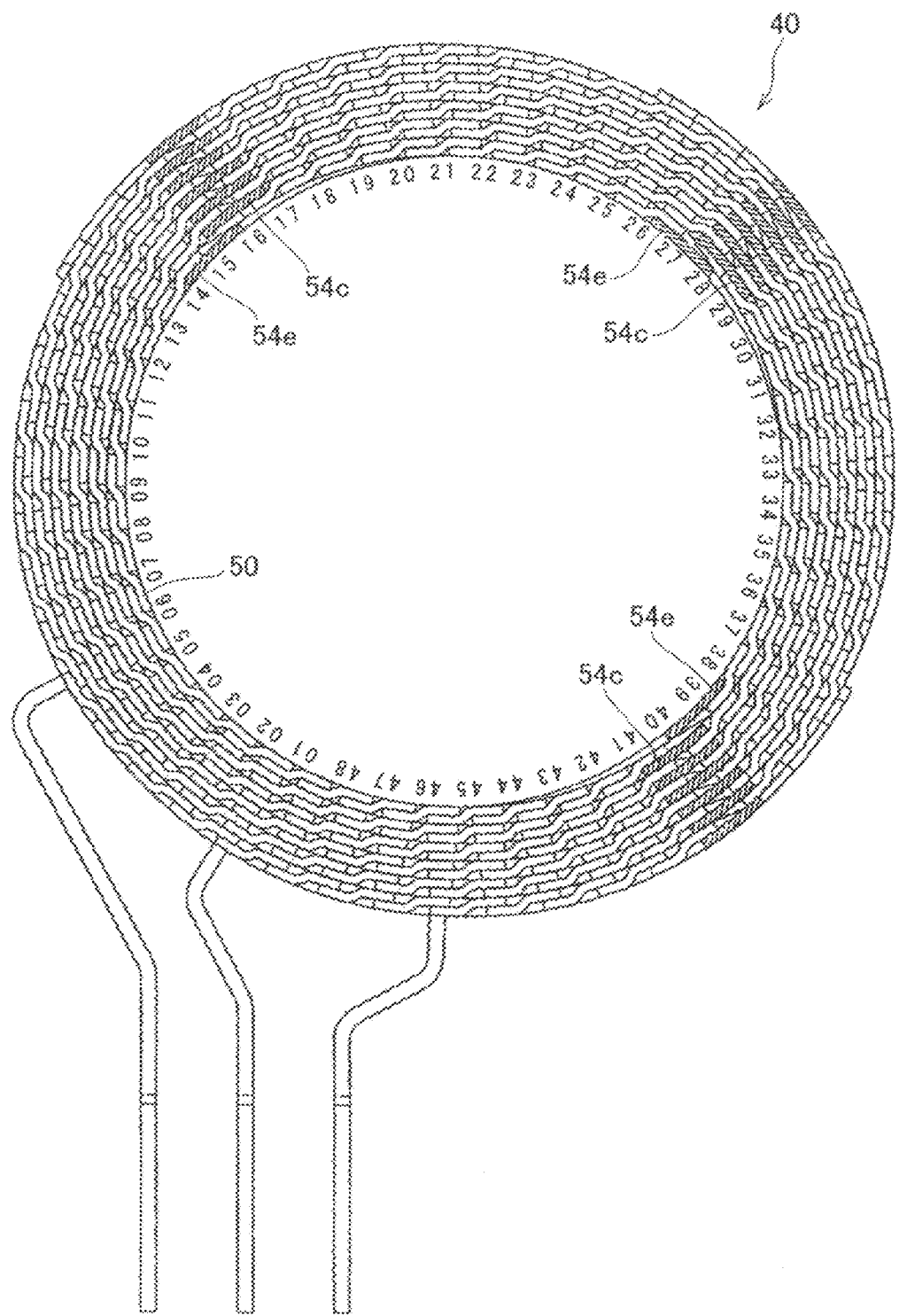
FIG. 6 is a bottom view of the stator coil.
Figure 7:
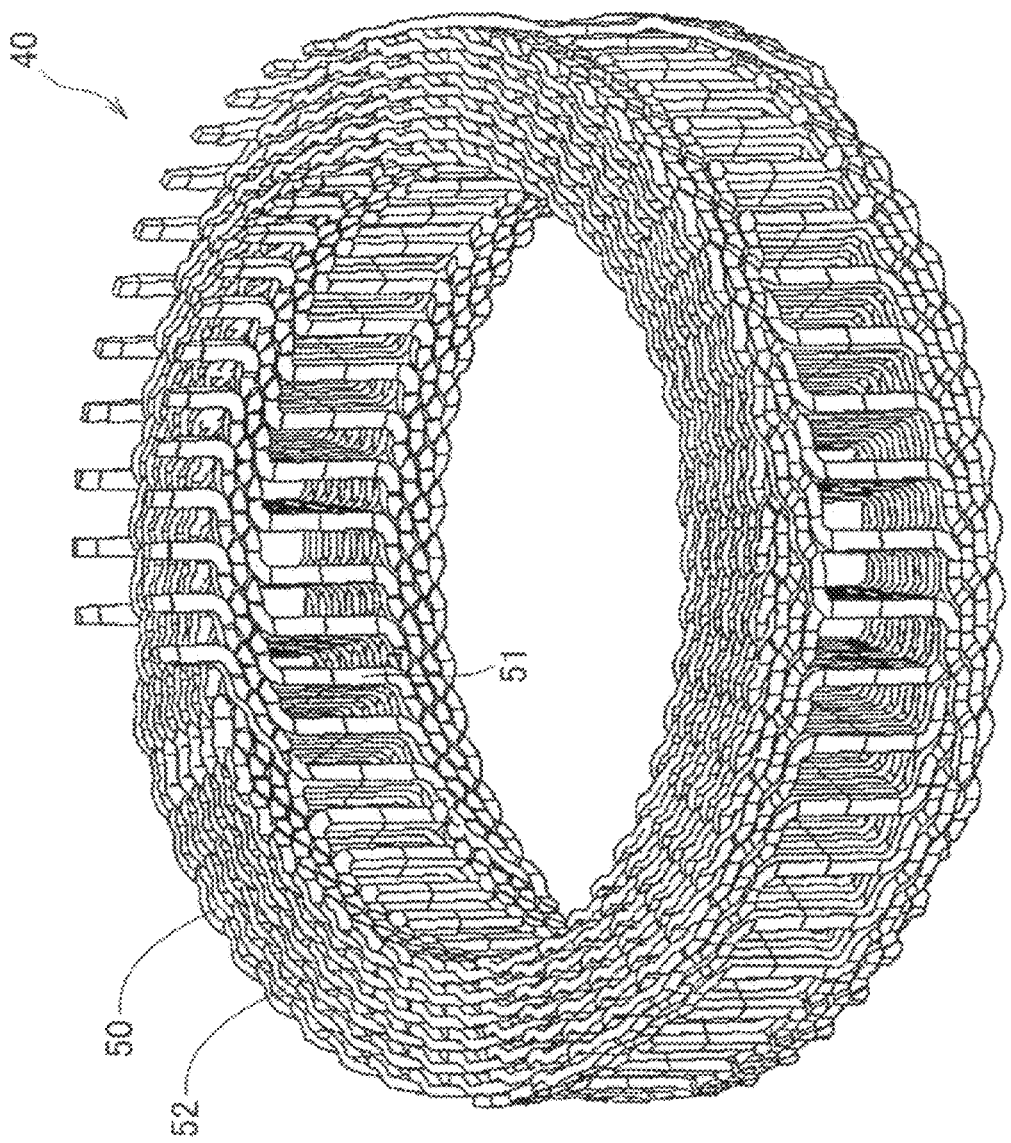
FIG. 7 is a perspective view of the stator coil.
Figure 8:
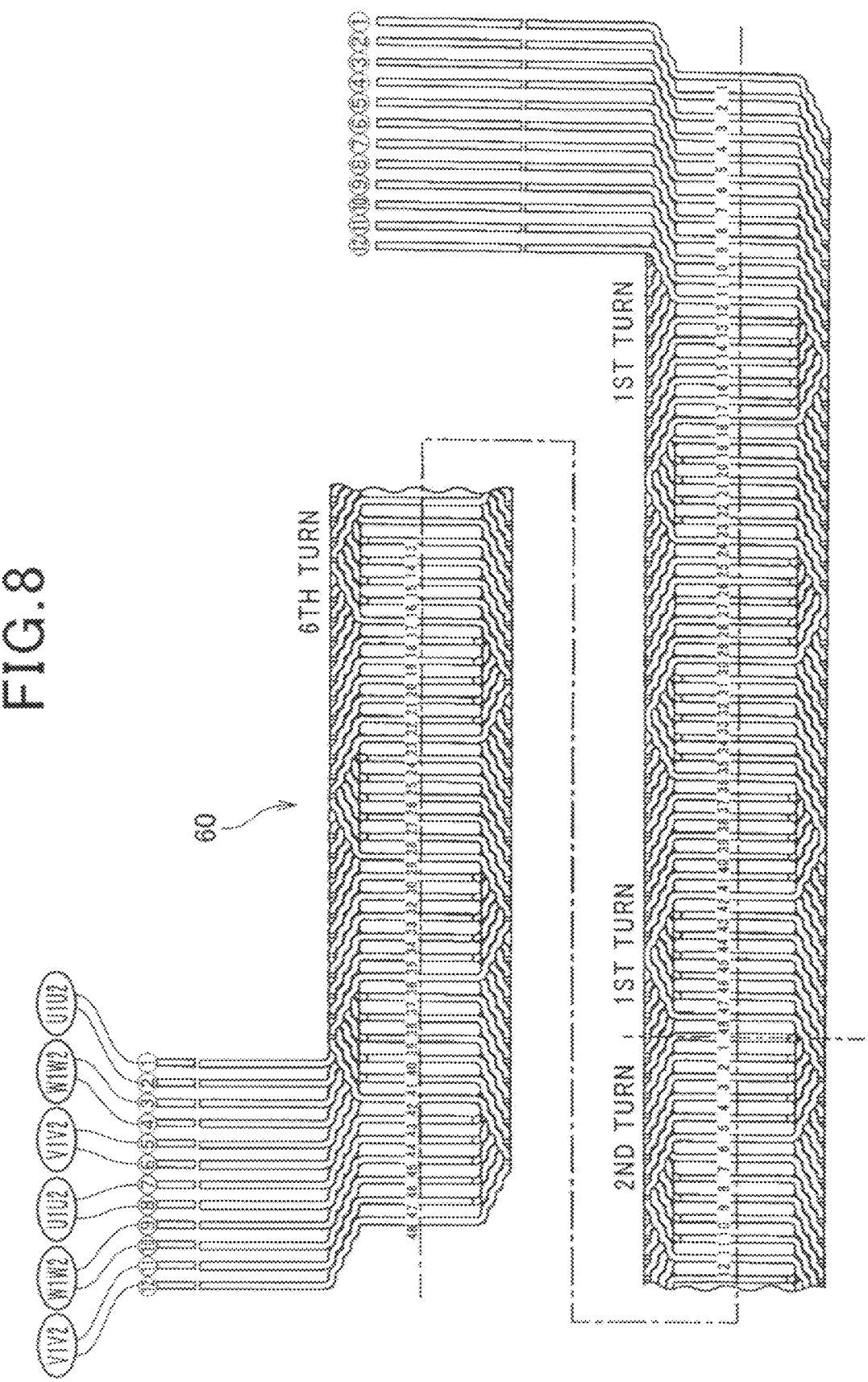
FIG. 8 is a front view of an electric wire assembly for forming the stator coil.
Figure 9:
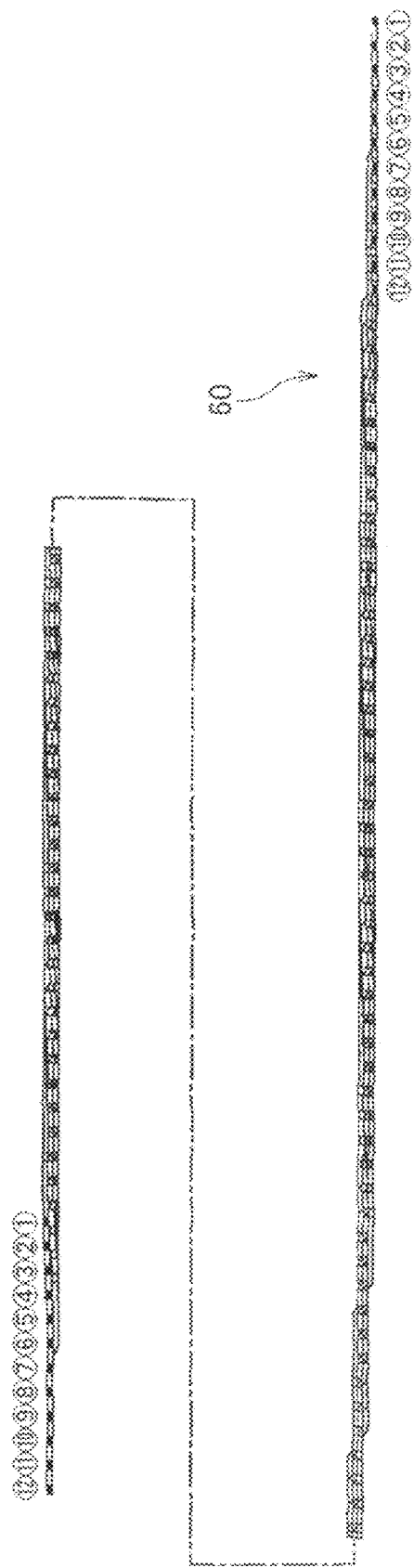
FIG. 9 is a top view of the electric wire assembly.

FIGS. 5-7 together show the overall configuration of the stator coil 40. In the present embodiment, the stator coil 40 is manufactured by stacking the twelve wave-shaped electric wires 50 to form a flat band-shaped electric wire assembly 60 as shown in FIGS. 8-11 and rolling the flat band-shaped electric wire assembly 60 by a predetermined number of turns (e.g., six turns) into a hollow cylindrical shape. In addition, in FIGS. 8-11, the twelve wave-shaped electric wires 50 are numbered with circled numbers 1-12.

Figure 23A:
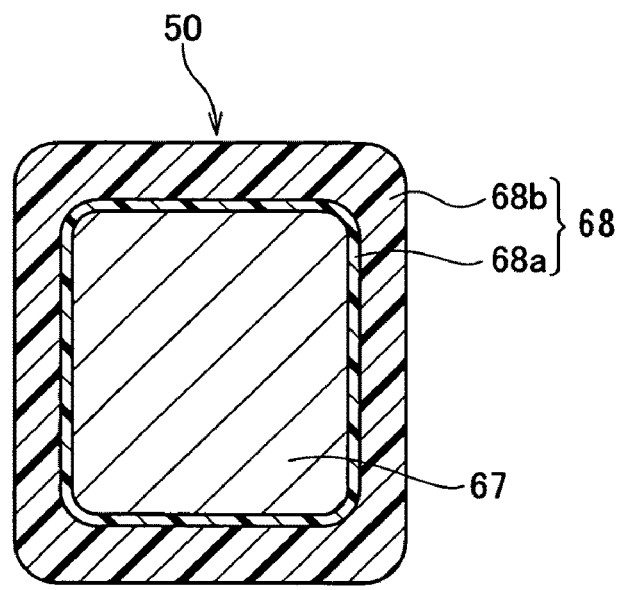
FIG. 23A is a schematic cross-sectional view illustrating the configuration of the electric wires for forming the stator coil according to the preferred embodiment.

Each of the electric wires 50 for forming the stator coil 40 is configured with, as shown in FIG. 23A, an electric conductor 67 and an insulating coat 68 that covers the outer surface of the electric conductor 67. In the present embodiment, the electric conductor 67 is made of copper and has a rectangular cross section. With the rectangular cross section, it is possible to mount the electric wires 50 on the stator core 30 at high density.

Moreover, in the present embodiment, the insulating coat 68 is two-layer structured to include an inner layer 68a and an outer layer 68b. The thickness of the insulating coat 68 (i.e., the sum of thicknesses of the inner and outer layers 68a and 68b) is set to be in the range of 100 to 200 μm.

With such a large thickness of the two-layer structured insulating coat 68, it is possible to reliably insulate the electric wires 50 from one another without interposing insulating paper sheets therebetween. However, it is also possible to interpose insulating paper sheets between the electric wires 50 so as to further enhance the electrical insulation therebetween.

Further, the outer layer 68b is made of an insulating material such as nylon. The inner layer 68a is made of an insulating material having a higher glass transition temperature than the outer layer 68b, such as a thermoplastic resin or a polyamide-imide resin. Consequently, the outer layers 68b of the electric wires 50 will be softened by the heat generated by operation of the electric rotating machine earlier than the inner layers 68a, thereby bonding together those portions of the electric wires 50 which are received in the same ones of the slots 31 of the stator core 30. As a result, those portions of the electric wires 50 will be integrated into a rigid body, thereby enhancing the mechanical strength thereof. In addition, for each of the electric wires 50, when excessive vibration occurs, the outer layer 68b will be first separated from the inner layer 68a, leaving the inner layer 68a to keep covering the outer surface of the electric conductor 67. As a result, the electrical insulation between the electric wires 50 can be maintained.

Figure 23B:
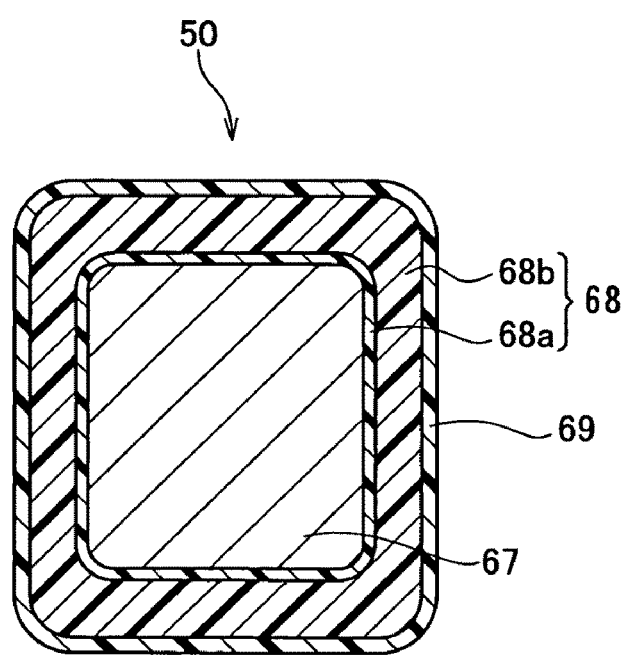
FIG. 23B is a schematic cross-sectional view illustrating a modification of the configuration of the electric wires shown in FIG. 23A.

Furthermore, as shown in FIG. 23B, it is also possible for each of the electric wires 50 to further include a fusible coat 69 to cover the outer surface of the insulating coat 68; the fusible coat 69 may be made, for example, of epoxy resin. In this case, the fusible coats 69 of the electric wires 50 will be fused by the heat generated by operation of the electric rotating machine earlier than the insulating coats 68, thereby bonding together those portions of the electric wires 50 which are received in the same ones of the slots 31 of the stator core 30. As a result, those portions of the electric wires 50 will be integrated into a rigid body, thereby enhancing the mechanical strength thereof. In addition, in this case, the outer layers 68b of the insulating coats 68 of the electric wires 50 may also be made of PPS (polyphenylene sulfide).

In the present embodiment, three different types of electric wires are employed as the electric wires 50 for forming the stator coil 40. More specifically, one electric wire 50A as shown in FIG. 12 is employed as the No. 1 electric wire 50; one electric wire 50B as shown in FIG. 13 is employed as the No. 12 electric wire 50; and ten electric wires 50C as shown in FIG. 14 are employed as the No. 2-No. 11 electric wires 50.

Figure 12:
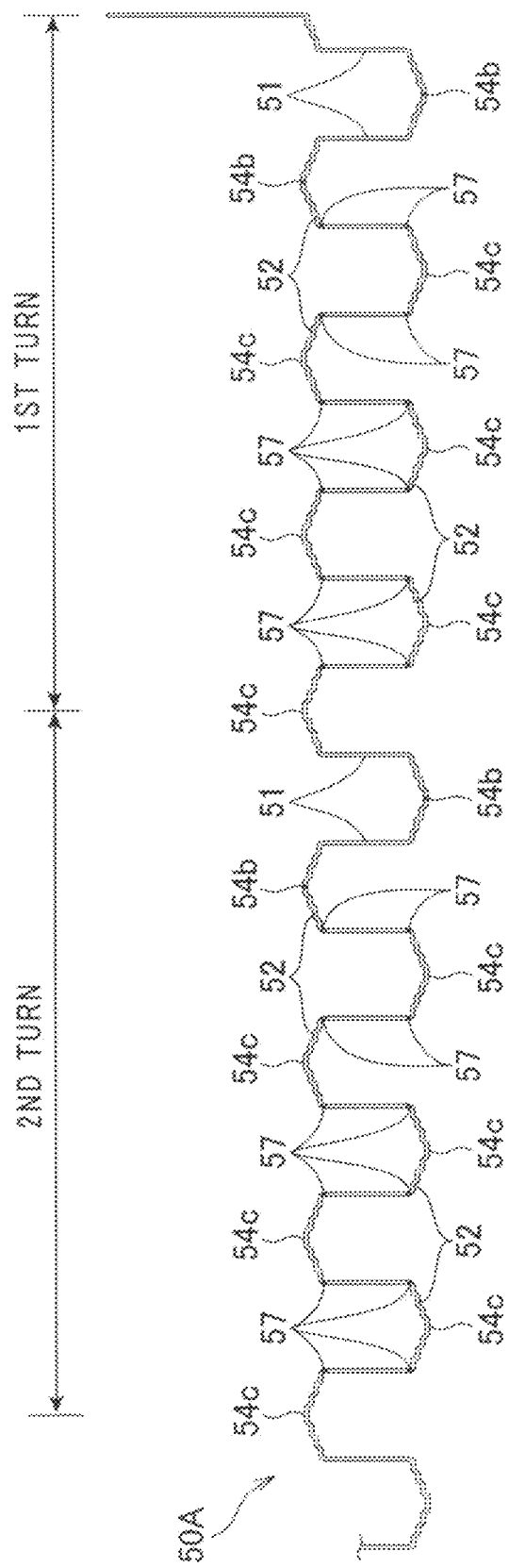
FIG. 12 is a front view of an end portion of a first-type electric wire for forming the electric wire assembly.

As shown in FIGS. 12-14, each of the twelve electric wires 50A-50C is wave-shaped to include a plurality of in-slot portions 51 and a plurality of turn portions 52.

The in-slot portions 51 are equally spaced in the longitudinal direction of the electric wire and extend perpendicular to the longitudinal direction. After assembling the stator core 30 to the stator coil 40, each of the in-slot portions 51 is received in a corresponding one of the slots 31 of the stator core 30.

Each of the turn portions 52 extends, on one side of the in-slot portions 51, with a turn to connect one adjacent-pair of the in-slot portions 51. After assembling the stator core 30 to the stator coil 40, each of the turn portions 52 is located outside of the slots 31 of the stator core 30.

The flat band-shaped electric wire assembly 60 shown in FIGS. 8-11 is formed by sequentially stacking the twelve electric wires 50A-50C with the No. 1 electric wire 50A lying at the bottom and with the No. 12 electric wire 50B lying at the top. Further, the twelve electric wires 50A-50C are so stacked that they are offset from one another in the longitudinal direction of the electric wire assembly 60 by a distance equal to the pitch of the slots 31 of the stator core 30. Consequently, the in-slot portions 51 of the No. 1 electric wire 50A respectively overlap with those of the No. 7 electric wire 50C; the in-slot portions 51 of the No. 2 electric wire 50C respectively overlap with those of the No. 8 electric wire 50C; the in-slot portions 51 of the No. 3 electric wire 50C respectively overlap with those of the No. 9 electric wire 50C; the in-slat portions 51 of the No. 4 electric wire 50C respectively overlap with those of the No. 10 electric wire 50C; the in-slot portions 51 of the No. 5 electric wire 50C respectively overlap with those of the No. 11 electric wire 50C; and the in-slot portions 51 of the No. 6 electric wire 50C respectively overlap with those of the No. 12 electric wire 50B. Each overlapping pair of the in-slot portions 51 of the electric wires 50A-50C are received in the same one of the slots 31 of the stator core 30.

In the present embodiment, there are the following similarities between the electric wires 50A, 50B, and 50C.

First, all of the in-slot portions 51 of the electric wires 50A-50C are formed to be identical to each other.

Secondly, as shown in FIGS. 15-18, each of the turn portions 52 of the electric wires 50A-50C includes, at the center thereof, an apex part 53 which is to be located axially furthest in the turn portion 52 from a corresponding axial end face 32 of the stator core 30 and extend parallel to the corresponding axial end face 32.

Thirdly, each of the turn portions 52 of the electric wires 50A-50C includes a pair of shoulder parts 55 which respectively adjoin the pair of in-slot portions 51 connected by the turn portion 52 and both extend perpendicular to the in-slot portions 51 (or parallel to the corresponding axial end face 32 of the stator core 30). Consequently, with the shoulder parts 55, the protruding height of each of the turn portions 52 from the corresponding axial end face 32 of the stator core 30 can be reduced. As a result, the axial length of coil ends of the stator coil 40 can be reduced. Here, the coil ends of the stator coil 40 denote the two axial end portions of the stator coil 40 which respectively protrude from the two opposite axial end faces 32 of the stator core 30 and are each made up of the turn portions 52 of the electric wires 50A-50C located on the same axial side of the stator core 30.

Figure 17A:
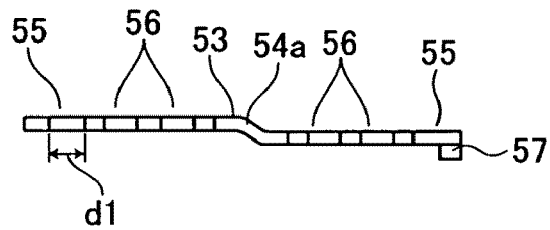
Figure 18A:
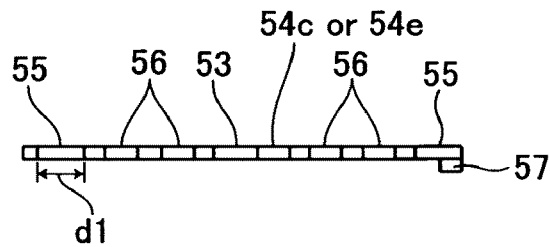
Figure 19:
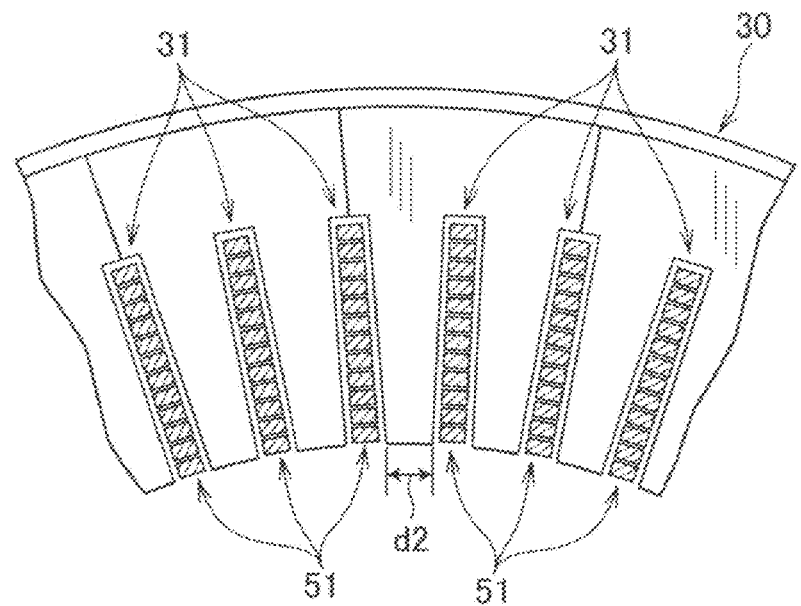
FIG. 19 is a schematic cross-sectional view illustrating high space factors of the electric wires in slots of the stator core which are achieved according to the preferred embodiment.

Further, in the present embodiment, there is specified the following dimensional relationship: $d1<d2$, where $d1$ is the length of each of the shoulder parts 55 of the electric wires 50A-50C as shown in FIGS. 15A, 16A, 17A, and 18A, and $d2$ is the distance between each circumferentially-adjacent pair of the slots 31 of the stator core 30 as shown in FIG. 19.

Specifying the above relationship, it is possible to prevent interference between each pair of the turn portions 52 of the electric wires 50A-50C which respectively protrude from one circumferentially-adjacent pair of the slots 31 of the stator core 30. Consequently, it is possible to prevent both the axial length and radial width of the coil ends of the stator coil 40 from being increased for preventing the above-described interference.

Fourthly, each of the turn portions 52 of the electric wires 50A-50C further includes two shoulder parts 56 between the apex part 53 and each of the shoulder parts 55. Accordingly, each of the turn portions 52 of the electric wires 50A-50C includes one apex part 53, two shoulder parts 55, and four shoulder parts 56. Each of the shoulder parts 56 extends, like the shoulder parts 55, perpendicular to the in-slot portions 51 (or parallel to the corresponding axial end face 32 of the stator core 30). Consequently, with the shoulder parts 56, the protruding height of each of the turn portions 52 from the corresponding axial end face 32 of the stator core 30 can be further reduced. As a result, the axial length, of the coil ends of the stator coil 40 can be further reduced.

In addition, each of the turn portions 52 of the electric wires 50A-50C can be seen as being stepped on both sides of the apex part 53 to reduce its protruding height from the corresponding axial end face 32 of the stator core 30.

In the present embodiment, there are also the following differences between the electric wires 50A, 50B, and 50C.

Figure 15A:
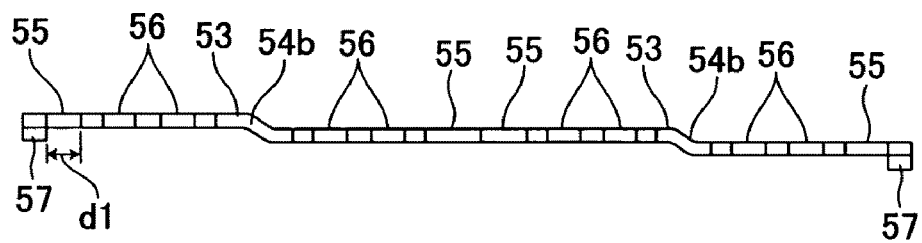
Figure 15B:
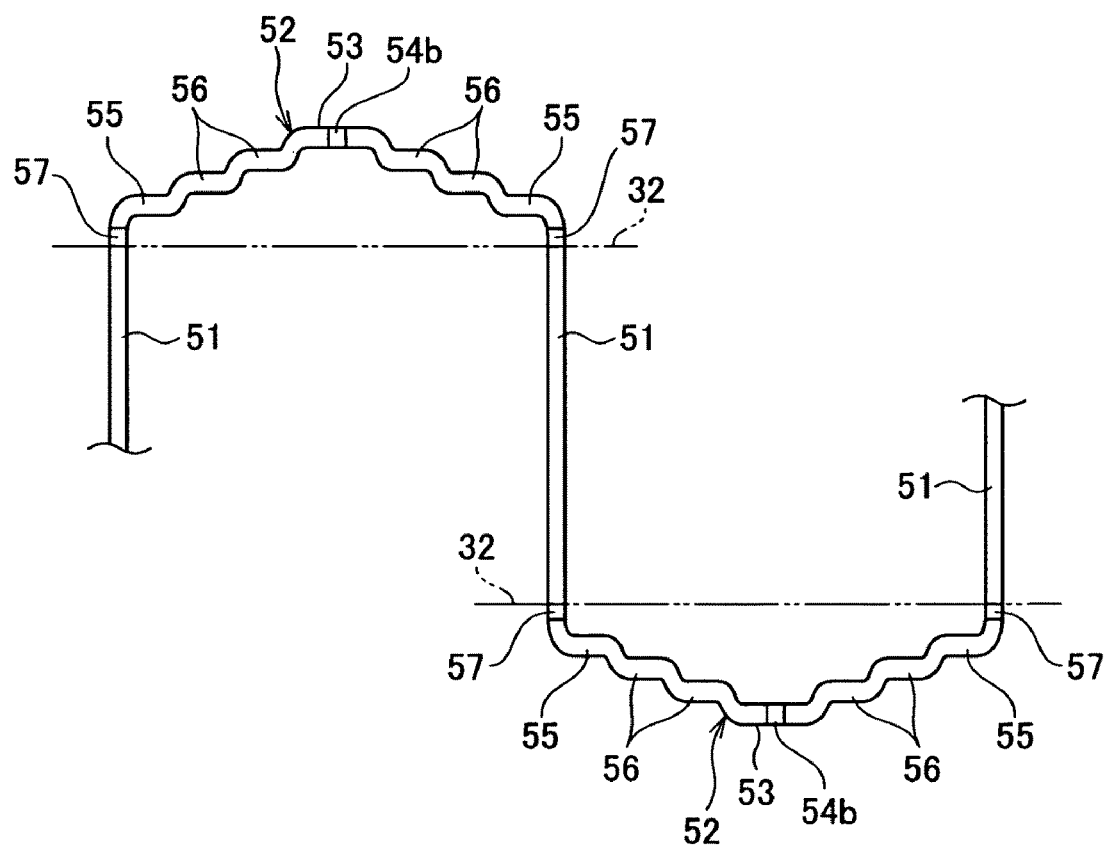

First, the electric wire 50A, which is employed as the No. 1 electric wire for forming the stator coil 40, includes a plurality of radial position shift portions 57. As shown in FIGS. 12 and 15A-15B, each of the radial position shift portions 57 is provided at a root part of one of the turn portions 52 of the electric wire 50A and bent radially outward from an end of one of the in-slot portions 51 of the electric wire 50A to shift the radial position of the electric wire 50A outward.

In the present embodiment, for each turn (or round) of the stator coil 40, counting from the rolling start side (i.e., the right side in FIG. 12), no radial position shift portions 57 are fowled to adjoin the first and second in-slot portions 51 of the electric wire 50A. However, for each of the third to eighth in-slot portions 51 of the electric wire 50A, there are two radial position shift portions 57 bent radially outward respectively from the opposite ends of the in-slot portion 51.

Further, in the present embodiment, the amount of radial position shift made by each of the radial position shift portions 57 is set to be substantially equal to the radial thickness of the electric wire 50A. Here, the amount of radial position shift made by each of the radial position shift portions 57 is defined as the difference in radial position between two parts of the electric wire 50A which adjoin the radial position shift portion 57 respectively from opposite sides of the radial position shift portion 57. More specifically, the two parts of the electric wire 50A respectively correspond to the end of the in-slot portion 51 which adjoins the radial position shift portion 57 from one side thereof and a part of the turn portion 52 which adjoins the radial position shift portion 57 from the other side.

Figure 21:
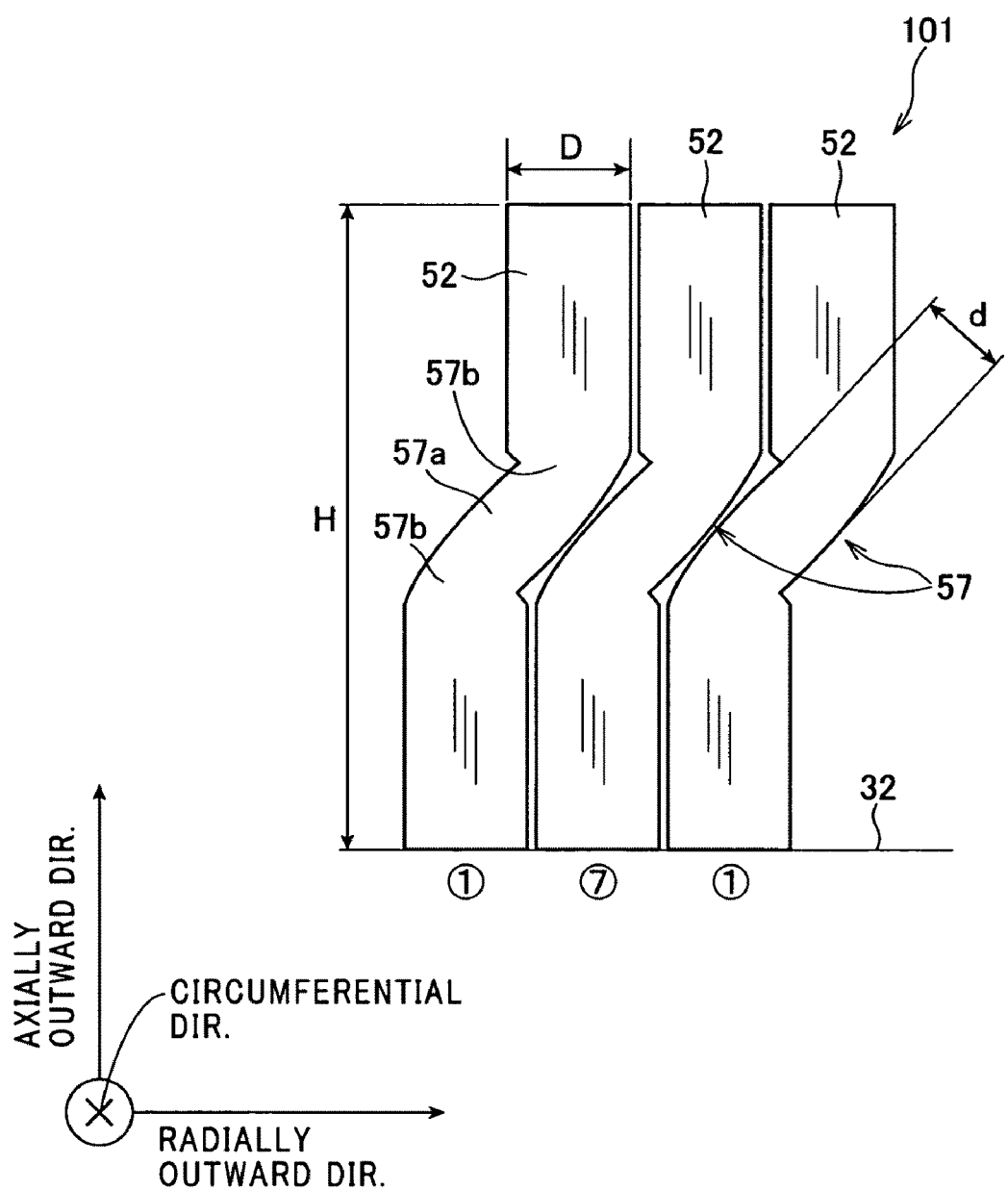
FIG. 21 is a schematic view illustrating the configuration of radial position shift portions of the electric wires according to the preferred embodiment.

FIG. 21 shows the configuration of each of the radial position shift portions 57 on a reference plane 101 that is defined to extend perpendicular to the circumferential direction of the stator core 30.

As shown in FIG. 21, each of the radial position shift portions 57 includes a straight part 57a at the center thereof and a pair of first and second bent parts 57b respectively on opposite sides of the straight part 57a. Specifically, each of the radial position shift portions 57 is first bent radially outward to form the first bent part 57b, extends straight to form the straight part 57a, and then bent axially outward to form the second bent part 57b. That is, in the present embodiment, each of the radial position shift portions 57 is bent twice to have a substantially crank shape. In this case, the amount of radial position shift made by each of the radial position shift portions 57 is equal to the difference in radial position between the first and second bent parts 57b.

In addition, though not shown in FIG. 21, the electric wire 50A is further bent from the axial direction of the stator core 30 to the circumferential direction of the same after being bent at the second bent part 57b. It should be noted that each of the radial position shift portions 57 may also be bent from the extending direction of the straight part 57a directly to the circumferential direction of the stator core 30, thereby omitting the second bent part 57b. That is to say, the shape of each of the radial position shift portions 57 is not restricted to the crank shape as shown in FIG. 21.

Furthermore, in the present embodiment, each of the radial position shift portions 57 is so formed that the thickness d of the straight part 57a on the reference plane 101 is less than the radial thickness D of other portions of the electric wire 50A which include the in-slot and turn portions 51 and 52.

Figure 16A:
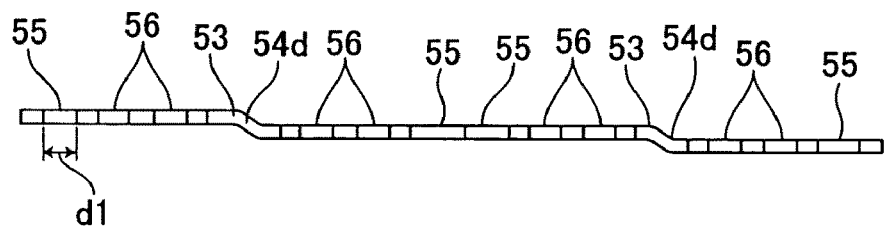
Figure 16B:
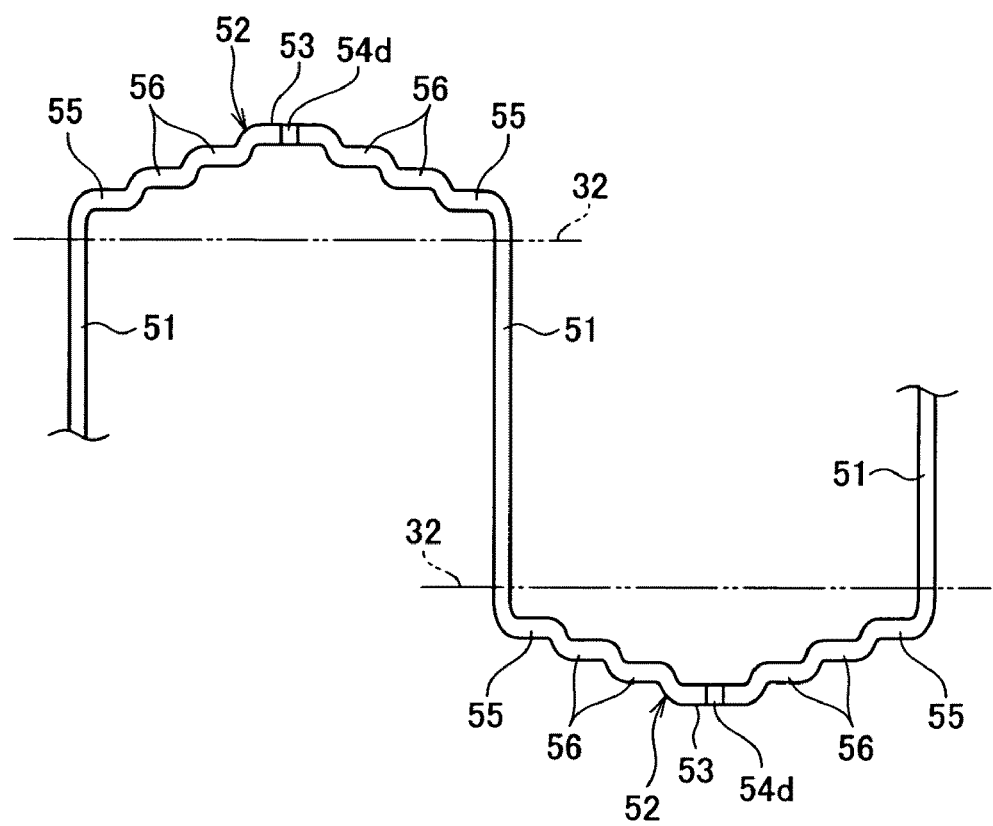

In comparison, as shown in FIGS. 13 and 16A-16B, the electric wire 50B, which is employed as the No. 12 electric wire 50 for forming the stator coil 40, includes no radial position shift portion 57.

Figure 17B:
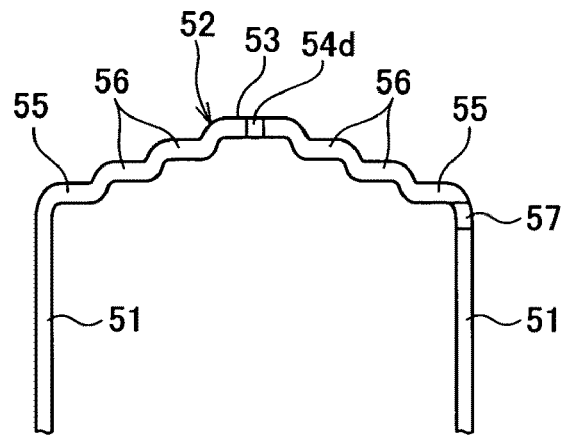

Further, among the ten electric wires 50C, the one which is employed as the No. 6 electric wire 50 for forming the stator coil 40 also includes no radial position shift portion 57. However, the other electric wires 50C, which are respectively employed as the No. 2-No. 5 and No. 7-No. 11 electric wires 50 for forming the stator coil 40, each include a plurality of radial position shift portions 57 as shown in FIGS. 14 and 17A-17B. The radial position shift portions 57 of the No. 2-No. 5 and No. 7-No. 11 electric wires 50C have the same configuration as those of the No. 1 electric wire 50A.

Moreover, in the present embodiment, for each pair of the electric wires 50A-50C which is received in the same slots 31 of the stator core 30, the amounts of radial position shift made by the radial position shift portions 57 are set to be the same.

Specifically, in the present embodiment, the in-slot portions 51 of the No. 1 electric wire 50A are received in the same slots 31 of the stator core 30 as those of the No. 7 electric wire 50C; the amount of radial position shift made by each of the radial position shift portions 57 in the No. 1 electric wire 50A is thus set to be equal to that in the No. 7 electric wire 50C. Similarly, the in-slot portions 51 of the No. 2 electric wire 50C are received in the same slots 31 of the stator core 30 as those of the No. 8 electric wire 50C; the amount of radial position shift made by each of the radial position shift portions 57 in the No. 2 electric wire 50C is thus set to be equal to that in the No. 8 electric wire 50C. The in-slot portions 51 of the No. 3 electric wire 50C are received in the same slots 31 of the stator core 30 as those of the No. 9 electric wire 50C; the amount of radial position shift made by each of the radial position shift portions 57 in the No. 3 electric wire 50C is thus set to be equal to that in the No. 9 electric wire 50C. The in-slot portions 51 of the No. 4 electric wire 50C are received in the same slots 31 of the stator core 30 as those of the No. 10 electric wire 50C; the amount of radial position shift made by each of the radial position shift portions 57 in the No. 4 electric wire 50C is thus set to be equal to that in the No. 10 electric wire 50C. The in-slot portions 51 of the No. 5 electric wire 50C are received in the same slots 31 of the stator core 30 as those of the No. 11 electric wire 50C; the amount of radial position shift made by each of the radial position shift portions 57 in the No. 5 electric wire 50C is thus set to be equal to that in the No. 11 electric wire 50C. In addition, the in-slot portions 51 of the No. 6 electric wire 50C are received in the same slots 31 of the stator core 30 as those of the No. 12 electric wire 50B; both the No. 6 electric wire 50C and the No. 12 electric wire 50B include no radial position shift portion 57.

Furthermore, in the present embodiment, the amounts of radial position shift made by the radial position shift portions 57 decrease in the order of the pair of No. 1 and No. 7 electric wires 50A and 50C, the pair of No. 2 and No. 8 electric wires 50C, the pair of No. 3 and No. 9 electric wires 50C, the pair of No. 4 and No. 10 electric wires 50C, and the pair of No. 5 and No. 11 electric wires 50C.

As described previously, the stator coil 40 is formed by stacking the twelve electric wires 50A-50C to form the flat band-shaped electric wire assembly 60 and rolling the electric wire assembly 60 by six turns into the hollow cylindrical shape. Moreover, each turn of the stator coil 40 includes two layers of the in-slot portions 51 of the electric wires 50A-50C. In the present embodiment, on the first layer (i.e., the radially inner layer) of the first turn (i.e., the radially innermost turn) of the stator coil 40, for each of the No. 7-No. 11 electric wires 50C, the amounts of radial position shift made by those radial position shift portions 57 which are respectively provided at the rolling start-side root parts of the turn portions 52 are set to zero. In other words, those radial position shift portions 57 are actually reduced to straight portions.

Figure 10:
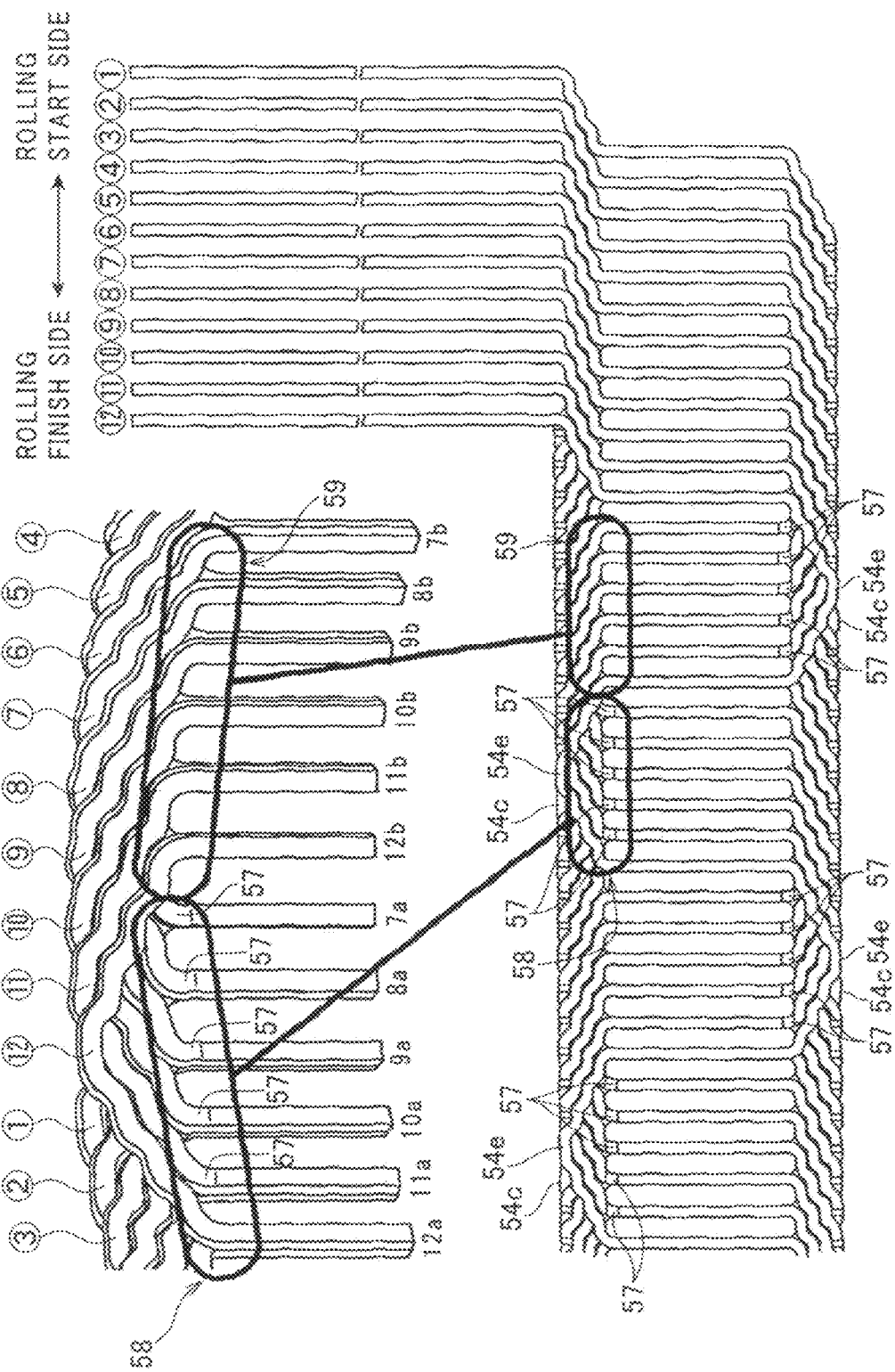
FIG. 10 is a schematic view illustrating, through enlargement, a portion of the electric wire assembly which makes up a portion of the first turn of the stator coil.

Consequently, as illustrated in FIG. 10, on the first layer of the first turn of the stator coil 40, there are formed first radial position shift portion groups 58 each of which is composed of adjacent six of those radial position shift portions 57 of the No. 7-No. 12 electric wires which are provided at the rolling finish-side root parts of the corresponding turn portions 52. In each of the first radial position shift portion groups 58, the amounts of radial position shift made by the radial position shift portions 57 decrease in the order of the No. 7, No. 8, ..., and No. 12 electric wires. It should be noted that the No. 12 electric wire 50B is considered here as including radial position shift portions 57 the amounts of radial position shift made by which are set to zero. Moreover, on the first layer of the first turn of the stator coil 40, there are also formed second radial position shift portion groups 59 each of which is composed of adjacent six of those radial position shift portions 57 of the No. 7-No. 12 electric wires which are provided at the rolling start-side root parts of the corresponding turn portions 52. In each of the second radial position shift portion groups 59, the amounts of radial position shift made by the radial position shift portions 57 are set to a constant value, more particularly to zero in the present embodiment. Further, on each axial side of the stator core 30, the first radial position shift portion groups 58 are alternately arranged with the second radial position shift portion groups 59 in the circumferential direction of the stator core 30.

Figure 11:
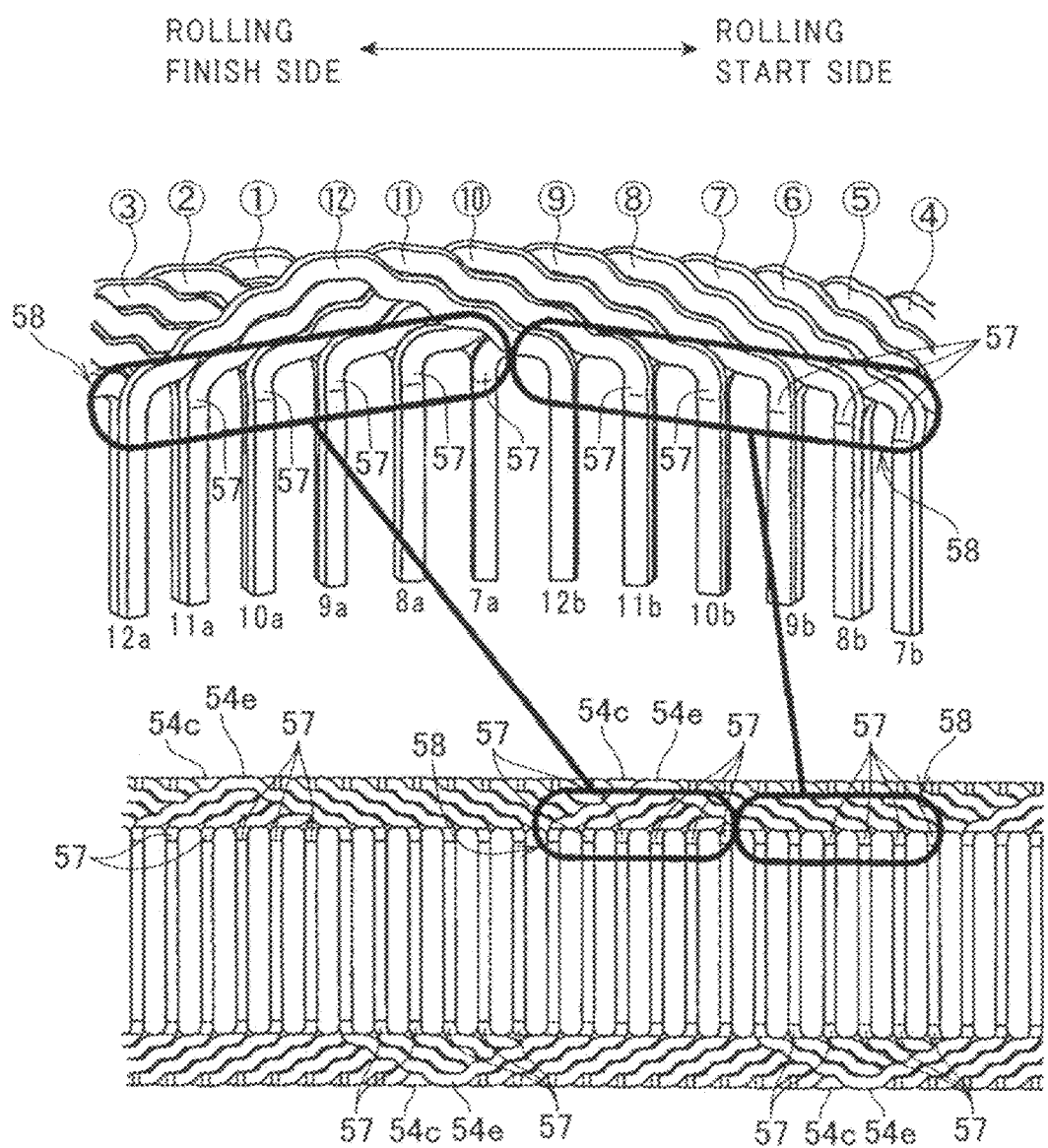
FIG. 11 is a schematic view illustrating, through enlargement, a portion of the electric wire assembly which makes up a portion of the second turn of the stator coil.

Furthermore, as illustrated in FIG. 11, in the second to sixth turns of the stator coil 40, there are formed only first radial position shift portion groups 58. Each of those first radial position shift portion groups 58 is composed of: either adjacent six of those radial position shift portions 57 of the No 7-No. 12 electric wires which are provided at the rolling finish-side root parts of the corresponding turn portions 52; or adjacent six of those radial position shift portions 57 of the No. 7-No. 12 electric wires which are provided at the rolling start-side root parts of the corresponding turn portions 52. Moreover, in each of those first radial position shift portion groups 58, the amounts of radial position shift made by the radial position shift portions 57 decrease in the order of the No. 7, No. 8, and No. 12 electric wires, Those first radial position shift portion groups 58 are cyclically arranged from the second turn to the six turn of the stator coil 40.

In addition, the amounts of radial position shift made by the radial position shift portions 57 in each of the first and second radial position shift portion groups 58 and 59 can be suitably set so as to make both the radially inner and outer surfaces of the stator coil 40 smooth and cylindrical.

After the stator core 30 is assembled to the stator coil 40 which is formed with the above-described electric wires 50A-50C, each of the slots 31 of the stator core 30 receives the in-slot portions 51 of only two of the electric wires 50A-50C. As described previously, the amounts of radial position shift made by the radial position shift portions 57 are the same for the two electric wires. Moreover, in each of the slots 31, the in-slot portions 51 of one of the two electric wires are alternately arranged with those of the other electric wire in the radial, direction of the stator core 30 (i.e., the depth-wise direction of the slot 31).

As described above, in the present embodiment, there are provided the radial position shift portions 57 in the No. 1 electric wire 50A and the No. 2-No. 5 and No. 7-No. 11 electric wires 50C. With the radial position shift portions 57, it is possible to prevent portions of the electric wires 50A-50C from protruding radially inward from the radially inner surface of the stator coil 40 or protruding radially outward from the radially outer surface of the stator coil 40. In other words, it is possible to make both the radially inner and outer surfaces of the stator coil 40 smooth and cylindrical.

Consequently, as shown in FIG. 19, the in-slot portions 51 of the electric wires 50A-50C can be reliably received in the corresponding slots 31 of the stator core 30 without protruding radially inward from the corresponding slots 51 and without forming void spaces at the bottoms of the corresponding slots 51. As a result, the space factors of the electric wires 50A-50C in the slots 31 of the stator core 30 can be maximized, thereby ensuring high performance of the stator 20.

In addition, in the present embodiment, each of the radial position shift portions 57 is bent radially outward. Consequently, the turn portions 52 of the electric wires 50A-50C can be reliably prevented from interfering with the rotor of the electric rotating machine which is to be disposed radially inside of the stator 20.

Figure 20:
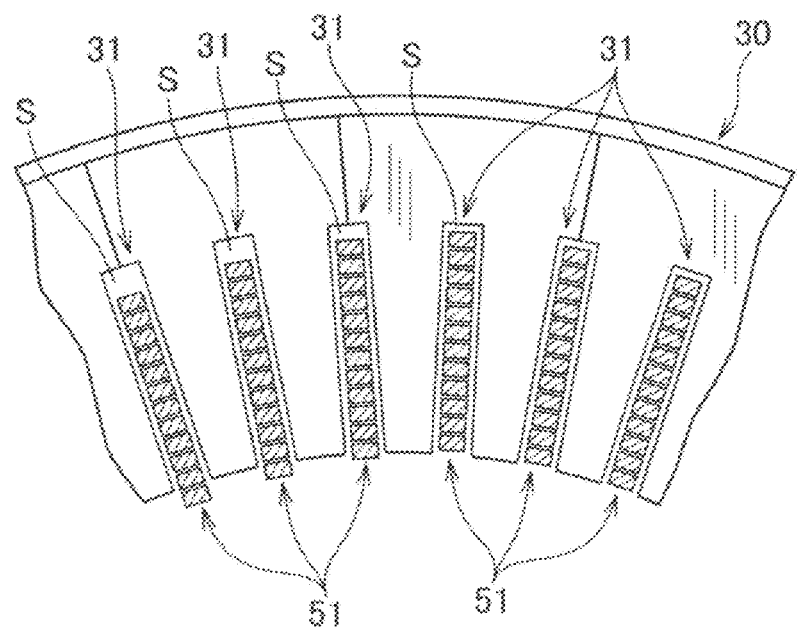
FIG. 20 is a schematic cross-sectional view illustrating low space factors of the electric wires in the slots which would be obtained according to an undesirable example.

In comparison, as shown in FIG. 20, without the radial position shift portions 57, some of the in-slot portions 51 of the electric wires 50A-50C would protrude radially inward from the corresponding slots 31 of the stator core 30, following void spaces S at the bottoms of the corresponding slots 31, Consequently, the space factors of the electric wires 50A-50C in the slots 31 of the stator core 30 would be decreased, thereby lowering the performance of the stator 20. In addition, those in-slot portions 51 of the electric wires 50A-50C which protrude radially inward from the corresponding slots 31 of the stator core 30 could interfere with the rotor of the electric rotating machine, lowering the reliability of the stator 20.

Furthermore, in the present embodiment, each of the radial position shift portions 57 of the electric wires 50A-50C includes the straight part 57a, and the thickness d of the straight part 57a is set to be less than the radial thickness D of other portions of the electric wires 50A-50C.

Setting the thickness d of the straight part 57a as above, all the axial distances between the bend start positions of the radial position shift portions 57 and the corresponding axial end faces 32 of the stator core 30 can be made equal as shown in FIG. 21. Consequently, the protruding height H of the turn portions 52 of the electric wires 50A-50C from the corresponding axial end faces 32 of the stator core 30 can be minimized.

Figure 22A:
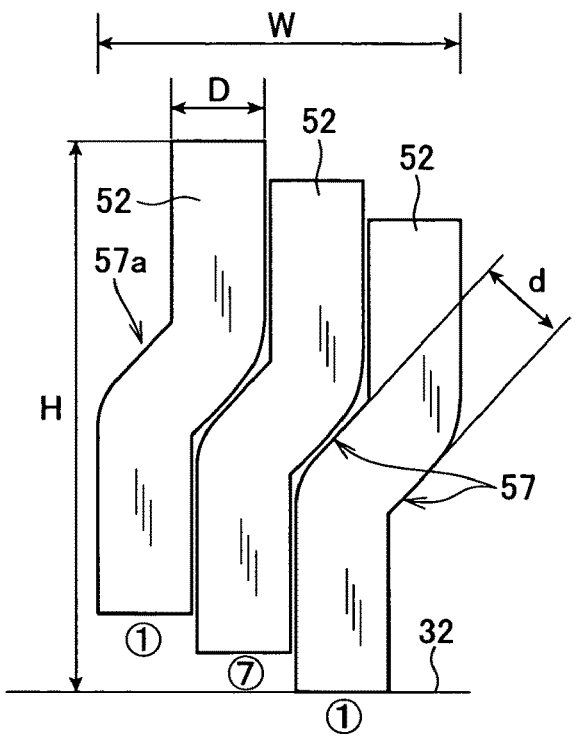
FIGS. 22A and 22B are schematic views illustrating the configurations of the radial position shift portions according to undesirable examples.
Figure 22B:
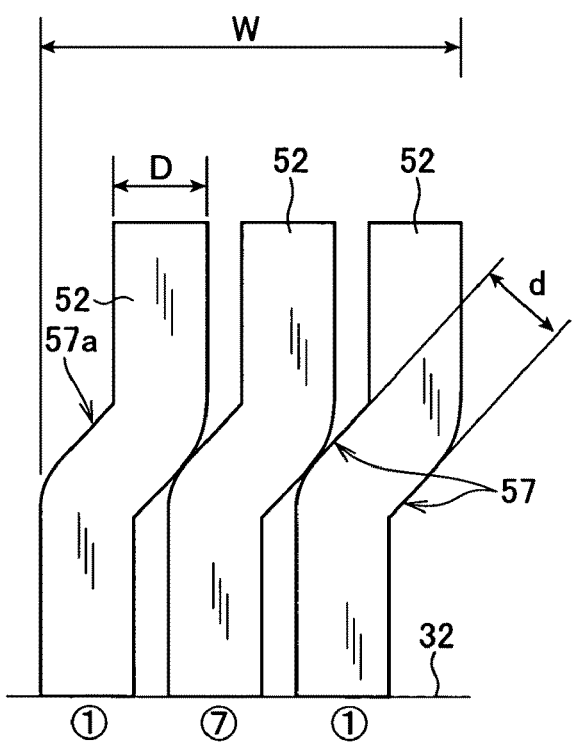

In comparison, as shown in FIG. 22A, if the thickness d were set to be equal to the thickness D, the axial distances between the bend start positions of the radial position shift portions 57 and the corresponding axial end faces 32 of the stator core 30 could not be made equal due to interference between the radial position shift portions 57. Consequently, the protruding height H of the turn portions 52 of the electric wires 50A-50C from the corresponding axial end faces 32 of the stator core 30 would be increased. In addition, with the thickness d equal to the thickness D, if the axial distances between the bend start positions of the radial position shift portions 57 and the corresponding axial end faces 32 of the stator core 30 were forcibly made equal, the radial position shift portions 57 would be displaced in the radial direction of the stator core 30, as shown in FIG. 223, thereby increasing the radial width W of the coil ends of the stator coil 40.

Next, the further differences in configuration between the electric wires 50A-50C will be described.

In the present embodiment, each of the No. 2-No. 11 electric wires 50C includes a plurality of first crank-shaped portions 54a, As shown in FIGS. 14 and 17A-17B, each of the first crank-shaped portions 54a is provided at the center of the apex part 53 of one of the turn portions 52 of the electric wire 50C and is radially bent to shift the radial position of the electric wire 50C. It should be noted that the term "crank-shaped" is used here only for the purpose of describing the overall shape of the portions 54a and does not restrict the angles between adjacent sections of the portions 54a to 90°. In addition, since the first crank-shaped portions 54a are provided in the apex parts 53 of the turn portions 52, they also extend parallel to the corresponding axial end faces 32 of the stator core 30.

In the present embodiment, the first crank-shaped portions 54a are provided in all of the apex parts 53 of the turn portions 52 of the electric wires 50C. Further, the amount of radial position shift made by each of the first crank-shaped portions 54a is set to be substantially equal to the radial thickness D of the electric wires 50C. Here, the amount of radial position shift made by each of the first crank-shaped portions 54a is defined as the difference in radial position between the two circumferential ends of the apex part 53 respectively on opposite sides of the first crank-shaped portion 54a.

Setting the amount of radial position shift made by each of the first crank-shaped portions 54a as above, it is possible to arrange each radially-adjacent pair of the turn portions 52 of the electric wires 50C in intimate contact with each other. As a result, the radial width W of the coil ends of the stator coil 40 can be minimized, thereby preventing the stator coil 40 from radially protruding from the stator core 30.

Figure 18B:
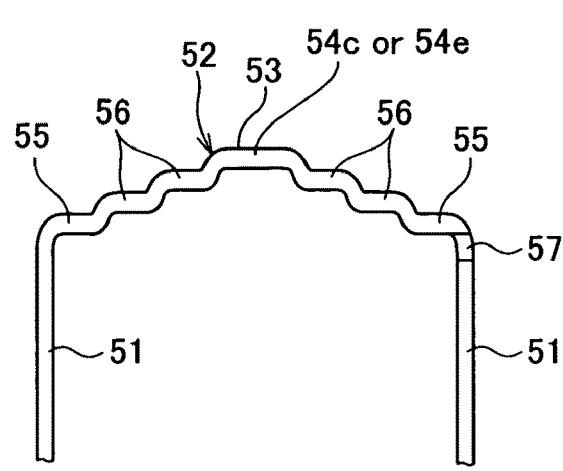

The No. 1 electric wire 50A includes six groups of crank-shaped portions. Each of the six groups includes two first crank-shaped portions 54b as shown in FIGS. 15A-15B and six second crank-shaped portions 54c as shown in FIGS. 18A-18B. The amount of radial position shift made by each of the first crank-shaped portions 54b is greater than that made by each of the second crank-shaped portions 54c.

In the present embodiment, as shown in FIG. 12, counting from the rolling start side (i.e., the right side in FIG. 12), the two first crank-shaped portions 54h of the first group are respectively provided at the centers of the apex parts 53 of the first and second turn portions 52, and the six second crank-shaped portions 54c of the first group are respectively provided at the centers of the apex parts 53 of the third to eighth turn portions 52. The second to sixth groups follow the first group, and the sequence of arrangement of the first and second crank-shaped portions 54b and 54c in each of the following five groups is the same as that in the first group.

As described previously, in the present embodiment, the stator coil 40 is formed by rolling the flat band-shaped electric wire assembly 60 shown in FIGS. 8-11 by six turns into the hollow cylindrical shape. Consequently, counting from the radially inner side of the stator coil 40, the first to sixth groups of the first and second crank-shaped portions 54b and 54c are respectively provided in the first to sixth turns (or rounds) of the stator coil 40.

Further, in the present embodiment, the amount of radial position shift made by each of the first crank-shaped portions 54b of the electric wire 50A is set to be equal to that made by each of the first crank-shaped portions 54a of the electric wires 50C. Moreover, the radial thickness D of the electric wire 50A is set to be equal to that of the electric wires 50C. Accordingly, the amount of radial position shift made by each of the first crank-shaped portions 54b of the electric wire 50A is substantially equal to the radial thickness D of the electric wire 50A. On the other hand, the amount of radial position shift made by each of the second crank-shaped portions 54c of the electric wire 50A is set to zero. That is to say, in the present embodiment, the second crank-shaped portions 54c of the electric wire 50A are actually reduced to straight portions 54c as shown in FIGS. 18A-18B. It should be noted that the amount of radial position shift made by each of the second crank-shaped portions 54c of the electric wire 50A may also be set to be greater than zero.

The No. 12 electric wire 50B includes 42 first crank-shaped portions 54d as shown in FIGS. 16A-16B and six second crank-shaped portions 54e as shown in FIGS. 18A-18B. The amount of radial position shift made by each of the first crank-shaped portions 54d is greater than that made by each of the second crank-shaped portions 54e. In the present embodiment, as shown in FIG. 13, counting from the rolling start side (i.e., the right side in FIG. 13), the six second crank-shaped portions 54e are respectively provided at the centers of the apex parts 53 of the first to sixth turn portions

52, and the 42 first crank-shaped portions 54*d* are respectively provided at the centers of the apex parts 53 of the seventh to 48th turn portions 52.

Further, in the present embodiment, the amount of radial position shift made by each of the first crank-shaped portions 54*d* of the electric wire 5013 is set to be equal to that made by each of the first crank-shaped portions 54*a* of the electric wires 50C. Moreover, the radial thickness D of the electric wire 50B is set to be equal to that of the electric wires 50C. Accordingly, the amount of radial position shift made by each of the first crank-shaped portions 54*d* of the electric wire 50B is substantially equal to the radial thickness D of the electric wire 50B. On the other hand, the amount of radial position shift made by each of the second crank-shaped portions 54*e* of the electric wire 50B is set to zero. That is to say, in the present embodiment, the second crank-shaped portions 54*e* of the electric wire 50B are actually reduced to straight portions 54*e* as shown in FIGS. 18A-18B. It should be noted that the amount of radial position shift made by each of the second crank-shaped portions 54*e* of the electric wire 50B may also be set to be greater than zero.

In the stator 20, which is obtained by assembling the stator core 30 to the stator coil 40 that is formed with the above-described electric wires 50A-50C, the second crank-shaped portions (or straight portions) 54*c* of the No. 1 electric wire 50A and the second crank-shaped (or straight portions) 54*e* of the No. 12 electric wire 508 are circumferentially located at three places on each axial side of the stator core 30.

Specifically, on one axial side of the stator core 30, as shown in FIG. 1, the second crank-shaped portions 54*c* (hatched in FIG. 1) of the No. 1 electric wire 50A are circumferentially located at three places which respectively correspond to the circumferential spaces between the No. 21 and No. 23 slots 31, between the No. 33 and NO. 35 slots 31, and between the No. 45 and No. 47 slots 31 of the stator core 30. Further, at each of the three places, there are six second crank-shaped portions 54*c* aligned in the radial direction of the stator core 30.

Figure 2:
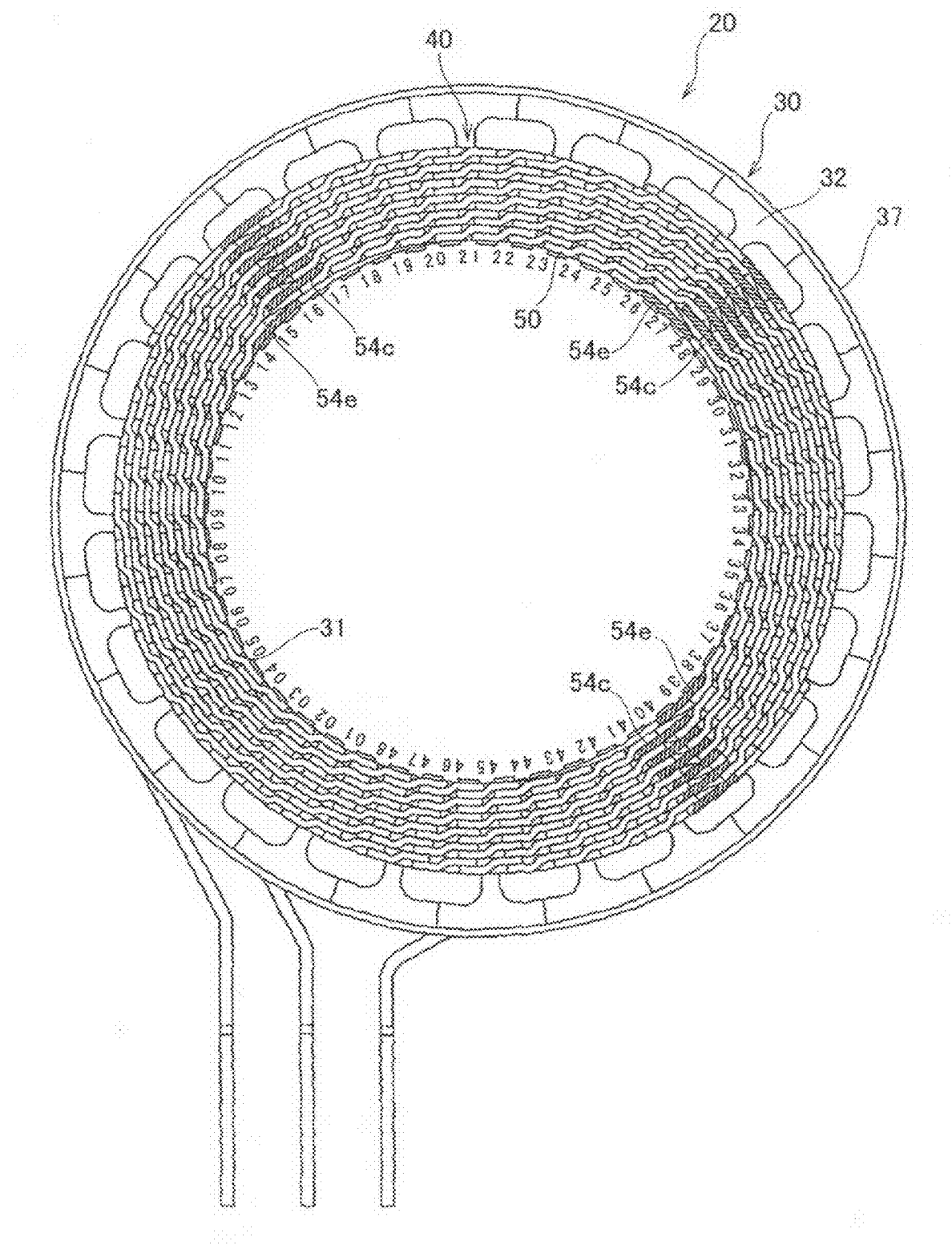
FIG. 2 is a bottom view of the stator.
Figure 3:
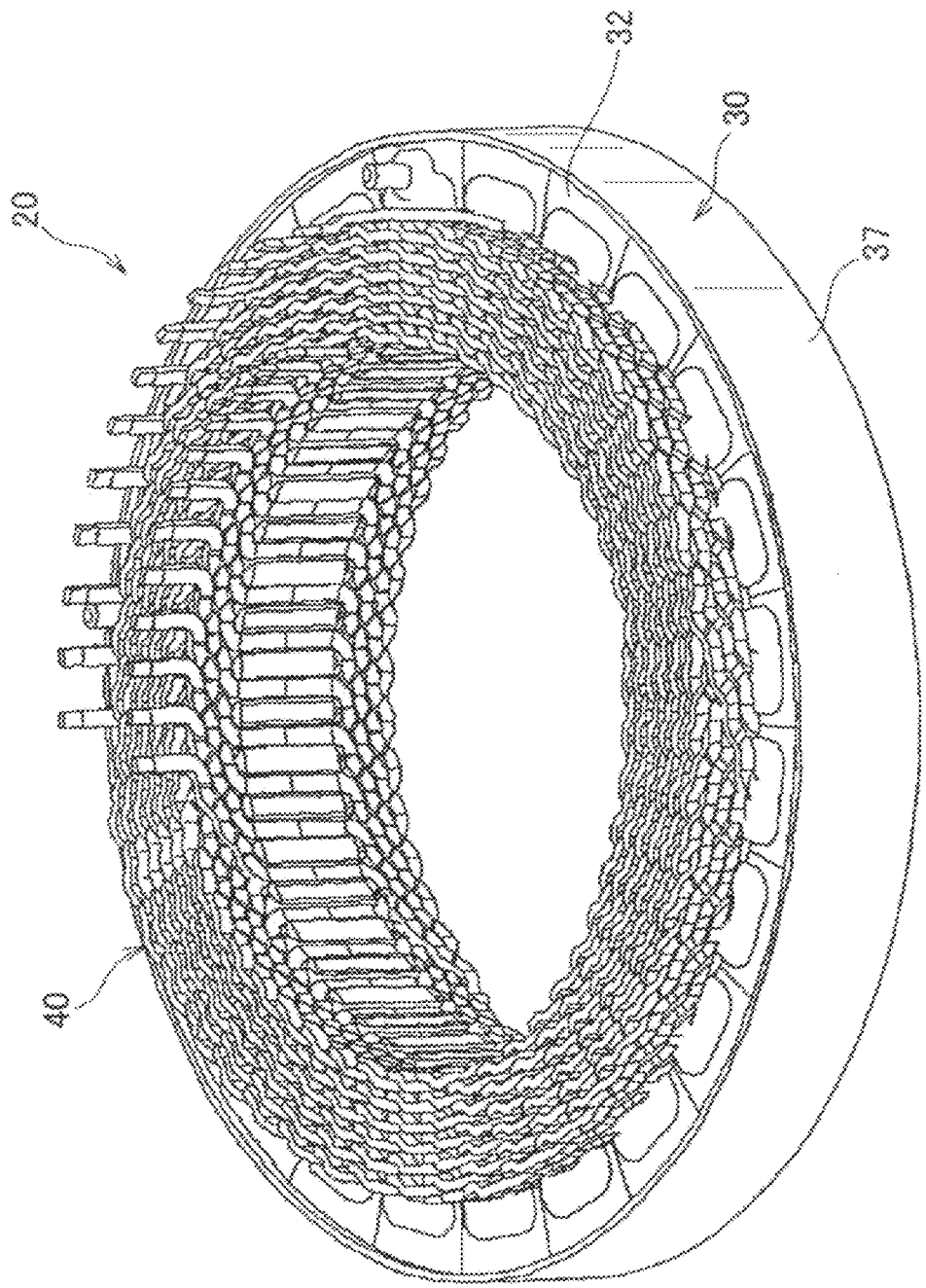
FIG. 3 is a perspective view of the stator.
Figure 4:
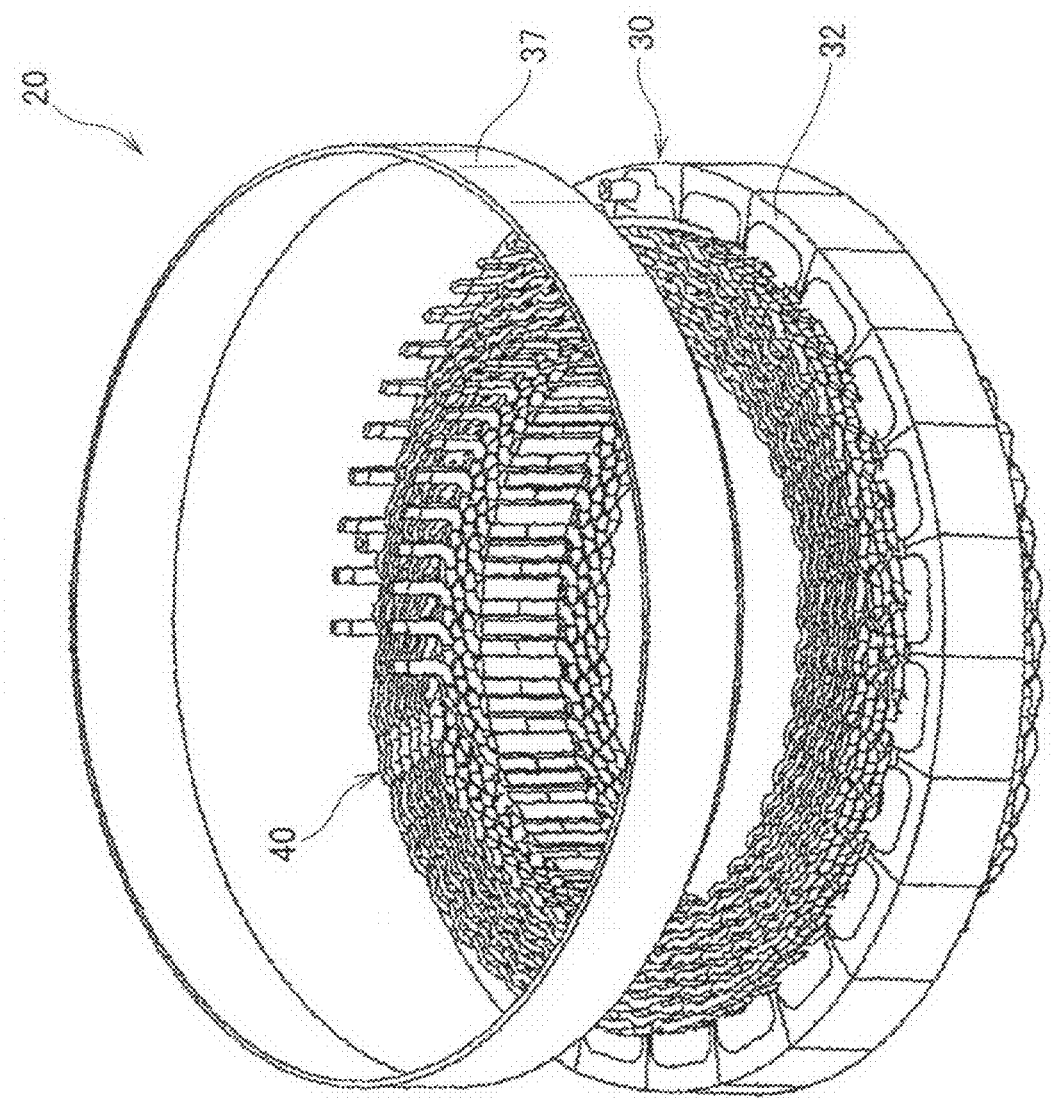
FIG. 4 is a perspective view showing the stator without an outer rim of a stator core of the stator.

On the other axial side of the stator core 30, as shown in FIG. 2, the second crank-shaped portions 54*c* (hatched in FIG. 2) of the No. 1 electric wire 50A are circumferentially located at three places which respectively correspond to the circumferential spaces between the No. 15 and No. 17 slots 31, between the No. 27 and NO. 29 slots 31, and between the No. 39 and No. 41 slots 31 of the stator core 30. Further, at each of the three places, there are six second crank-shaped portions 54*c* aligned in the radial direction of the stator core 30.

With the second crank-shaped portions 54*c* (or straight portions 54*c* in the present embodiment) of the No. 1 electric wire 50A, it is possible to keep the coil ends of the stator coil 40 from protruding radially outward at the six places where the second crank-shaped portions 54*c* are located. Moreover, with the first crank-shaped portions 54*b* of the No. 1 electric wire 50A, the transitions of the No. 1 electric wire 50A between different turns of the stator coil 40 can be made smoothly without increasing the radial width W of the coil ends of the stator coil 40.

Moreover, on the one axial side of the stator core 30, as shown in FIG. 1, the second crank-shaped portions 54*e* (hatched in FIG. 1) of the No. 12 electric wire 50B are circumferentially located at three places which respectively correspond to the circumferential spaces between the No. 20 and No. 22 slots 31, between the No 32 and NO. 34 slots 31, and between the No. 44 and No. 46 slots 31 of the stator core 30. Further, at each of the three places, there is one second crank-shaped portion 54*e* located only on the radially inner surface of the stator coil 40 (or in the innermost turn of the stator coil 40).

On the other axial side of the stator core 30, as shown in FIG. 2, the second crank-shaped portions 54*e* (hatched in FIG. 2) of the No. 12 electric wire 50B are circumferentially located at three places which respectively correspond to the circumferential spaces between the No. 14 and No. 16 slots 31, between the No. 26 and NO. 28 slots 31, and between the No. 38 and No. 40 slots 31 of the stator core 30. Further, at each of the three places, there is one second crank-shaped portion 54*e* located only on the radially inner surface of the stator coil 40 (or in the innermost turn of the stator coil 40).

With the second crank-shaped portions 54*e* (or straight portions 54*e* in the present embodiment) of the No. 12 electric wire 503, it is possible to keep the coil ends of the stator coil 40 from protruding radially inward at the six places where the second crank-shaped portions 54*e* are located. As a result, it is possible to prevent the stator coil 40 from interfering with the rotor of the electric rotating machine which is to be disposed radially inside of the stator 20.

Figure 24:
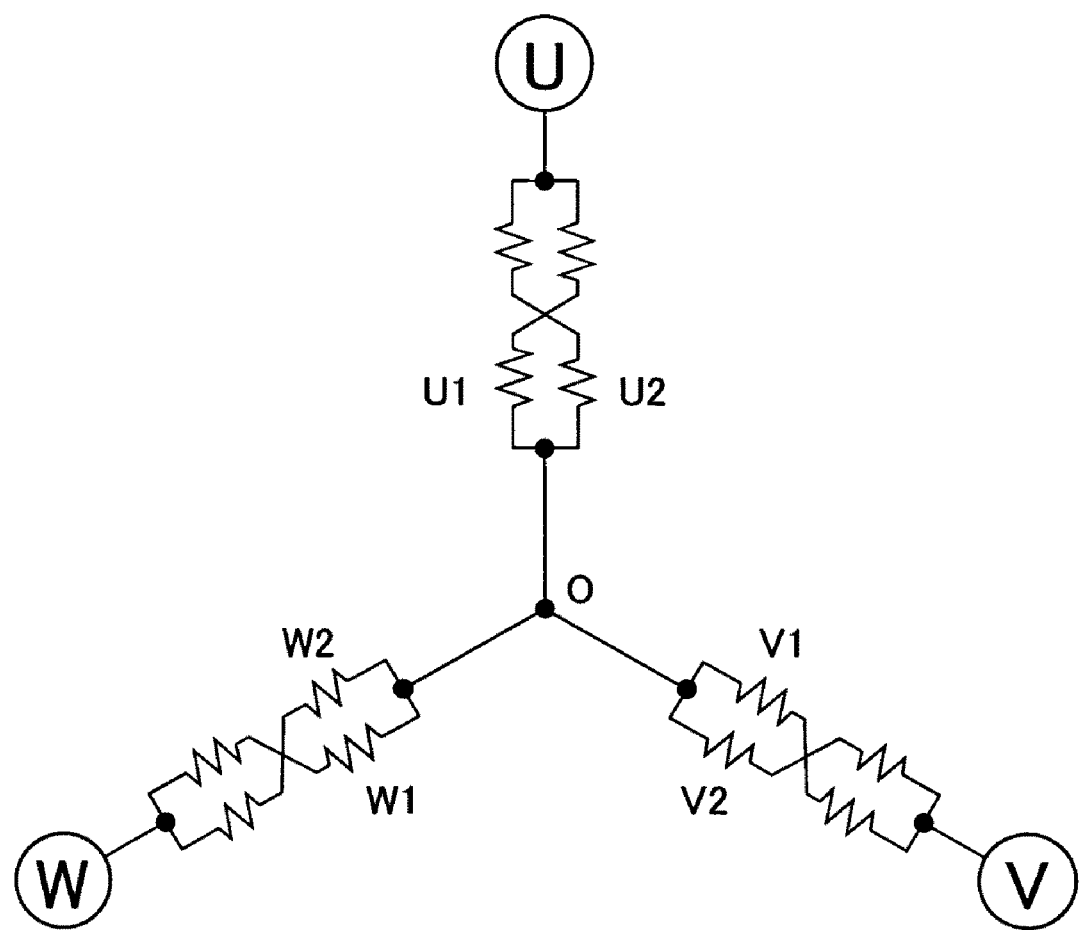
FIG. 24 is a schematic circuit diagram of the stator according to the preferred embodiment.

Referring now to FIG. 24, in the present embodiment, the stator coil 40 is made up of six phase windings U1, U2, V1, V2, and W2. The phase windings U1 and U2 are connected in parallel with each other to make up a U-phase winding of the stator coil 40. Similarly, the phase windings V1 and V2 are connected in parallel with each other to make up a V-phase winding of the stator coil 40. The phase windings W1 and W2 are connected in parallel with each other to make up a W-phase winding of the stator coil 40. Further, the U-phase, V-phase, and W-phase windings are Y-connected to have a neutral point O therebetween.

Moreover, in the present embodiment, each of the six phase windings U1, U2, V1, V2, W1, and W2 of the stator coil 40 is formed by joining a pair of the electric wires 50A-50C by, for example, welding. In other words, each of the six phase windings U1, U2, V1, V2, W1, and W2 is composed of two of the twelve electric wires 50A-50C.

In the stator 20, each of the twelve electric wires 50A-50C is wave-wound around the stator core 30 so as to extend in the circumferential direction of the stator core 30. In the present embodiment, the slots 31 of the stator core 3D are divided into eight groups each of which includes six circumferentially-adjacent slots 31. For each of the electric wires 50A-50C, all of the in-slot portions 51 of the electric wire are received in eight slots 31 that belong respectively to the eight groups and are spaced six slots 31 apart in the circumferential direction of the stator core 30. Further, for each of the electric wires 50A-50C, each of the turn portions 52 of the electric wire protrudes from one of the axial end faces 32 of the stator core 30 to connect one circumferentially-adjacent pair of the in-slot portions 51 of the electric wire. Consequently, all of the turn portions 52 of the electric wires 50 are located outside of the slots 31 of the stator core 30 to make up the coil ends of the stator coil 40.

Furthermore, for each of the electric wires 50A-50C, one end of the electric wire protrudes from a radially outmost part of one of the slots 31 of the stator core 30; the other end of the electric wire protrudes from a radially innermost part of another one of the slots 31 of the stator core 30. Further, both the ends of the electric wire protrude from the same axial end face 32 of the stator core 30. Each of the slots 31 of the stator core 30 receives the in-slot portions 51 of only two of the electric wires 50A-50C. Further, in each of the slots 31, the in-slot portions 51 of one of the two electric wires are alternately arranged with those of the other electric wire in the depth-wise direction of the slot 31.

After having described the overall configuration of the stator 20 according to the present embodiment, the advantages thereof will be described hereinafter.

In the present embodiment, the stator 20 includes the hollow cylindrical stator core 30 and the stator coil 40. The stator core 30 has the slots 31 that are formed in the radially inner surface of the stator core 30 and spaced at predetermined intervals in the circumferential direction of the stator core 30. The stator coil 40 is made up of the twelve wave-shaped electric wires 50A-50C mounted on the stator core 30. Each of the electric wires 50A-50C has the in-slot portions 51, each of which is received in one of the slots 31 of the stator core 30, and the turn portions 52 each of which is located outside of the slots 31 of the stator core 30 to connect one adjacent pair of the in-slot portions 51 of the electric wire. Each of the turn portions 52 includes the apex part 53 that is located axially furthest in the turn portion 52 from the stator core 30. Furthermore, the stator coil 40 includes the first crank-shaped portions 54a, 54b, and 54d and the second crank-shaped portions 54c and 54e. Each of the first and second crank-shaped portions 54a-54e is provided, in one of the electric wires 50A-50C, at the center of the apex part 53 of one of the turn portions 52 of the electric wire and is radially bent to shift the radial position of the electric wire. The amount of radial position shift made by each of the second crank-shaped portions 54c and 54e is less than that made by each of the first crank-shaped portions 54a, 54b, and 54d. More particularly, in the present embodiment, the amount of radial position shift made by each of the second crank-shaped portions 54c and 54e is set to zero. In other words, each of the second crank-shaped portions 54c and 54e is actually reduced to a straight portion that extends in the circumferential direction of the stator core 30 without being radially bent. Moreover, the second crank-shaped portions 54c and 54e are located at a plurality of places in the circumferential direction of the stator core 30.

With the first crank-shaped portions 54a of the electric wires 50C, the first crank-shaped portions 54b of the electric wire 50A, and the first crank-shaped portions 54d of the electric wire 50B, it is possible to prevent interference between the turn portions 52 of the electric wires 50A-50C protruding from circumferentially-adjacent pairs of the slots 31 of the stator core 30. Moreover, with the second crank-shaped portions 54c of the electric wire 50A and the second crank-shaped portions 54e of the electric wire 50B, it is possible to keep the coil ends of the stator coil 40 from protruding radially outward or radially inward at the places where the second crank-shaped portions 54c and 54e are located. As a result, both the outer diameter and radial width of the stator coil 40 can be minimized, thereby making it possible to downsize the stator 20.

In addition, it should be noted that the number of the places for locating the second crank-shaped portions 54c and 54e can be suitably set according to the number of the slots 31 of the stator core 30 and the number of the electric wires 50A-50C making up the stator coil 40.

In the present embodiment, each of the electric wires 50C includes only the first crank-shaped portions 54a. The electric wire 50A includes both the first crank-shaped portions 54b and the second crank-shaped portions 54c. The electric wire 50B includes both the first crank-shaped portions 54d and the second crank-shaped portions 54e.

Consequently, by suitably combining the different types of the electric wires 50A-50C, it is possible to reliably minimize both the outer diameter and radial width of the stator coil 40.

In the present embodiment, the electric wire 50A includes the six crank-shaped portion groups each of which consists of the two first crank-shaped portions 54b and the six second crank-shaped portions 54c. The six crank-shaped portion groups are cyclically arranged in the longitudinal direction of the electric wire 50A. Consequently, it becomes possible for the six crank-shaped portion groups to be respectively located on the first to sixth turns of the stator coil 40.

With the second crank-shaped portions 54c, it is possible to keep the coil ends of the stator coil 40 from protruding radially outward at the six places where the second crank-shaped portions 54c are located. Moreover, with the first crank-shaped portions 54b, the transitions of the No. 1 electric wire 50A between different turns of the stator coil 40 can be made smoothly without increasing the radial width W of the coil ends of the stator coil 40.

In addition, it should be noted that the numbers of the first and second crank-shaped portions 54b and 54c in each of the six crank-shaped portion groups can be suitably set according to the number of the slots 31 of the stator core 30 and the number of the electric wires 50A-50C making up the stator coil 40.

In the present embodiment, the electric wire 50B includes the 42 first crank-shaped portions 54d on one longitudinal end side (more specifically, the rolling start side) and the six second crank-shaped portions 54e on the other longitudinal end side (more specifically, the rolling finish side) of the electric wire 50B. The sum of 42 and 6 is equal to 48, which is equal to the number of the apex parts 53 of the turn portions 52 in the electric wire 50B.

Consequently, by arranging the six second crank-shaped portions 54e on the first layer (i.e., the radially inner layer) of the first turn (i.e., the radially innermost turn) of the stator coil 40, it is possible to keep the coil ends of the stator coil 40 from protruding radially inward at the six places where the second crank-shaped portions 54e are located. As a result, it is possible to prevent the stator coil 40 from interfering with the rotor of the electric rotating machine which is to be disposed radially inside of the stator 20.

In addition, it should be noted that the numbers of the first and second crank-shaped portions 54d and 54e in the electric wire 508 can be suitably set according to the number of the slots 31 of the stator core 30 and the number of the electric wires 50A-50C making up the stator coil 40.

In the present embodiment, the number of the electric wires 50A-50C making up the stator coil 40 is twelve. The stator coil 40 is a hollow cylindrical electric wire assembly that is formed by rolling the flat band-shaped electric wire assembly 60 by six turns; the flat band-shaped electric wire assembly 60 is formed by sequentially stacking the twelve electric wires 50A-50C. Moreover, the electric wires 50C, each of which includes only the first crank-shaped portions 54a, are employed as the No. 2-No. 11 electric wires in the sequential stacking of the twelve electric wires 50A-50C.

Consequently, the turn portions 52 of the electric wires 50C can be reliably prevented from protruding radially outward from the radially outer surface and radially inward from the radially inner surface of the stator coil 40.

In the present embodiment, each of the turn portions 52 of the electric wires 50A-50C is stepped to include the plurality of shoulder parts 55 and 56 that extend parallel to the corresponding axial end face 32 of the stator core 30 from which the turn portion 52 protrudes.

With the shoulder parts 55 and 56, the protruding height H of each of the turn portions 52 from the corresponding axial end face 32 of the stator core 30 can be reduced. As a result, the axial length of coil ends of the stator coil 40 can be reduced.

In the present embodiment, each of the electric wires 50A-50C is made up of the electric conductor 67 having the rectangular cross section and the insulating coat 68 covering the surface of the electric conductor 67.

With the rectangular cross section, it is possible to densely arrange the in-slot portions 51 of the electric wires 50A-50C in the slots 31 of the stator core 30, thereby improving the space factors of the electric wires 50A-50C in the slots 31. Moreover, it is also possible to densely and regularly arrange the turn portions 52 of the electric wires 50A-50C, thereby reducing both the axial length and radial width of the coil ends of the stator coil 40.

While the above particular embodiment of the present invention has been shown and described, it will be understood by those skilled in the art that various modifications, changes, and improvements may be made without departing from the spirit of the invention.

What is claimed is:

1. A stator for an electric rotating machine, the stator comprising:
    a hollow cylindrical stator core having a plurality of slots that are formed in a radially inner surface of the stator core and spaced at predetermined intervals in a circumferential direction of the stator core; and
    a stator coil made up of a plurality of wave-shaped electric wires mounted on the stator core, each of the electric wires having a plurality of in-slot portions, each of which is received in one of the slots of the stator core, and a plurality of turn portions each of which is located outside of the slots of the stator core to connect one adjacent pair of the in-slot portions of the electric wire, each of the turn portions including an apex part that is located axially furthest in the turn portion from the stator core,
    wherein
    the stator coil includes a plurality of first crank-shaped portions and a plurality of second crank-shaped portions,
    each of the first and second crank-shaped portions is provided, in one of the electric wires, at the center of the apex part of one of the turn portions of the electric wire and at least the first crank-shaped portions are radially bent to shift the radial position of the electric wire,
    any amount of radial position shift made by each of the second crank-shaped portions is less than that made by each of the first crank-shaped portions, and
    the second crank-shaped portions are located at a plurality of places in the circumferential direction of the stator core.

2. The stator as set forth in claim 1, wherein the plurality of electric wires comprise first-type electric wires and second-type electric wires,
    each of the first-type electric wires includes only at least one of the first crank-shaped portions, and each of the second-type electric wires includes both at least one of the first crank-shaped portions and at least one of the second crank-shaped portions.

3. The stator as set forth in claim 2, wherein one of the second-type electric wires includes a plurality of crank-shaped portion groups each of which consists of m of the first crank-shaped portions and n of the second crank-shaped portions, where m and n each represent an integer greater than zero, and
    the plurality of crank-shaped portion groups are cyclically arranged in a longitudinal direction of the second-type electric wire.

4. The stator as set forth in claim 2, wherein one of the second-type electric wires includes j of the first crank-shaped portions on one longitudinal end side and k of the second crank-shaped portions on the other longitudinal end side of the second-type electric wire, where j and k each represent an integer greater than zero, and the sum of j and k is equal to the number of the apex parts of the turn portions in the second-type electric wire.

5. The stator as set forth in claim 2, wherein the number of the electric wires making up the stator coil is h, where h is an integer greater than 1,
    the stator coil is a hollow cylindrical electric wire assembly that is formed by rolling a flat band-shaped electric wire assembly by a predetermined number of turns, and the flat band-shaped electric wire assembly is formed by sequentially stacking the h electric wires, and
    the second to (h−1)th electric wires in the sequential stacking of the h electric wires are the first-type electric wires.

6. The stator as set forth in claim 1, wherein each of the turn portions of the electric wires is stepped to include a plurality of shoulder parts that extend parallel to an axial end face of the stator core from which the turn portion protrudes.

7. The stator as set forth in claim 1, wherein each of the electric wires is made up of an electric conductor having a rectangular cross section and an insulating coat covering the surface of the electric conductor.

8. A stator for an electric rotating machine, the stator comprising:
    a hollow cylindrical stator core having a plurality of slots that are formed in a radially inner surface of the stator core and spaced at predetermined intervals in a circumferential direction of the stator core; and
    a stator coil made up of a plurality of wave-shaped electric wires mounted on the stator core, each of the electric wires having a plurality of in-slot portions, each of which is received in one of the slots of the stator core, and a plurality of turn portions each of which is located outside of the slots of the stator core to connect one adjacent pair of the in-slot portions of the electric wire, each of the turn portions including an apex part that is located axially furthest in the turn portion from the stator core,
    wherein
    the stator coil includes a plurality of crank-shaped portions and a plurality of straight portions,
    each of the crank-shaped portions is provided, in one of the electric wires, at the center of the apex part of one of the turn portions of the electric wire and is radially bent to shift the radial position of the electric wire,
    each of the straight portions is provided, in one of the electric wires, at the center of the apex part of one of the turn portions of the electric wire and extends in the circumferential direction of the stator core without being radially bent, and
    the straight portions are located at a plurality of places in the circumferential direction of the stator core.

9. The stator as set forth in claim 8, wherein the plurality of electric wires comprise first-type electric wires and second-type electric wires,
    each of the first-type electric wires includes only at least one of the crank-shaped portions, and each of the second-type electric wires includes both at least one of the crank-shaped portions and at least one of the straight portions.

10. The stator as set forth in claim 9, wherein one of the second-type electric wires includes a plurality of crank-shaped portion groups each of which consists of m of the crank-shaped portions and n of the straight portions, where m and n each represent an integer greater than zero, and the plurality of crank-shaped portion groups are cyclically arranged in a longitudinal direction of the second-type electric wire.

11. The stator as set forth in claim 9, wherein one of the second-type electric wires includes j of the crank-shaped portions on one longitudinal end side and k of the straight portions on the other longitudinal end side of the second-type electric wire, where j and k each represent an integer greater than zero, and the sum of j and k is equal to the number of the apex parts of the turn portions in the second-type electric wire.

12. The stator as set forth in claim 9, wherein the number of the electric wires making up the stator coil is h, where h is an integer greater than 1, the stator coil is a hollow cylindrical electric wire assembly that is formed by rolling a flat band-shaped electric wire assembly by a predetermined number of turns, and the flat band-shaped electric wire assembly is formed by sequentially stacking the h electric wires, and the second to (h−1)th electric wires in the sequential stacking of the h electric wires are the first-type electric wires.

13. The stator as set forth in claim 8, wherein each of the turn portions of the electric wires is stepped to include a plurality of shoulder parts that extend parallel to an axial end face of the stator core from which the turn portion protrudes.

14. The stator as set forth in claim 8, wherein each of the electric wires is made up of an electric conductor having a rectangular cross section and an insulating coat covering the surface of the electric conductor.

* * * * *